(12) United States Patent
Roush

(10) Patent No.: US 7,946,606 B2
(45) Date of Patent: May 24, 2011

(54) CONVERTER DOLLY BACKUP DEVICE

(75) Inventor: Mark A Roush, Lafayette, IN (US)

(73) Assignee: Vanguard National Trailer Corp., Monon, IN (US)

( * ) Notice: Subject to any disclaimer, the term of this patent is extended or adjusted under 35 U.S.C. 154(b) by 434 days.

(21) Appl. No.: 12/184,572

(22) Filed: Aug. 1, 2008

(65) Prior Publication Data

US 2009/0033060 A1   Feb. 5, 2009

Related U.S. Application Data

(60) Provisional application No. 60/963,251, filed on Aug. 3, 2007.

(51) Int. Cl.
*A01B 59/041* (2006.01)
*B60D 1/36* (2006.01)
*B62D 53/00* (2006.01)

(52) U.S. Cl. ............... 280/476.1; 280/474; 280/477

(58) Field of Classification Search .............. 280/408, 280/432, 446.1, 455.1, 460.1, 474, 476.1, 280/477, 478.1, 491.1
See application file for complete search history.

(56) References Cited

U.S. PATENT DOCUMENTS

| | | | | |
|---|---|---|---|---|
| 2,159,253 A | * | 5/1939 | Bush | 280/455.1 |
| 2,309,204 A | | 1/1943 | Nelson | |
| 2,590,962 A | | 4/1952 | Gurton | |
| 2,592,219 A | | 4/1952 | West | |
| 2,929,642 A | * | 3/1960 | Dinkel et al. | 280/443 |
| 3,421,777 A | | 1/1969 | Barker | |
| 3,556,560 A | | 1/1971 | Adams | |
| 3,612,575 A | | 10/1971 | Stewart | |
| 3,663,039 A | * | 5/1972 | Morgan | 280/408 |
| 3,680,891 A | | 8/1972 | Rendessy | |
| 3,697,099 A | | 10/1972 | Potts | |
| 3,740,076 A | * | 6/1973 | Cupp | 280/432 |
| 3,782,759 A | | 1/1974 | Thune | |
| 3,801,137 A | | 4/1974 | Zucca | |
| 3,815,939 A | | 6/1974 | Pettay | |
| 3,837,678 A | * | 9/1974 | Cicero | 280/432 |
| 4,162,082 A | | 7/1979 | Curry | |
| 4,345,775 A | * | 8/1982 | Merrifield | 280/443 |
| 4,573,699 A | | 3/1986 | Smith | |
| 4,603,876 A | | 8/1986 | Gray | |
| 4,790,556 A | * | 12/1988 | Hawkins et al. | 280/432 |
| 5,098,115 A | | 3/1992 | Haire | |
| 5,247,442 A | | 9/1993 | Kendall | |

(Continued)

*Primary Examiner* — Paul N Dickson
*Assistant Examiner* — Marc A Scharich
(74) *Attorney, Agent, or Firm* — Dowell Baker, P.C.

(57) ABSTRACT

A backup device for limiting the rotation of converter dollies about a trailer hitch is presented. A dolly mounted, laterally extending moveable bar is selectively pressed against the vertical members of the trailer's underride guard in order to prevent rotation of the dolly relative to the trailer. The bar is retracted from the trailer to allow significant rotation of the dolly during normal forward operation. The backup device is operable with many makes and models of trailers because the laterally extending bar provides a large area that the trailer underride guard may contact. In addition to being operable with many models of trailers, the present invention does not require specific features to be added onto a trailer pulling the converter dolly. Additionally, the large contact area of the laterally extending bar allows the device to function with dollies that are significantly rotated about a trailer hitch. The backup device is also robust, aerodynamic, and self contained. Although manual operation of the device is possible, by connecting the device to the pressurized trailer brake line, the electrical circuitry of the trailer, or other means, the backup device may be operated from within the tractor cab.

19 Claims, 23 Drawing Sheets

U.S. PATENT DOCUMENTS

| | | |
|---|---|---|
| 5,348,332 A | 9/1994 | Hamilton |
| 5,407,221 A | 4/1995 | Haire |
| 6,152,475 A | 11/2000 | Poole |
| 6,565,108 B1 | 5/2003 | Gearhart |

* cited by examiner

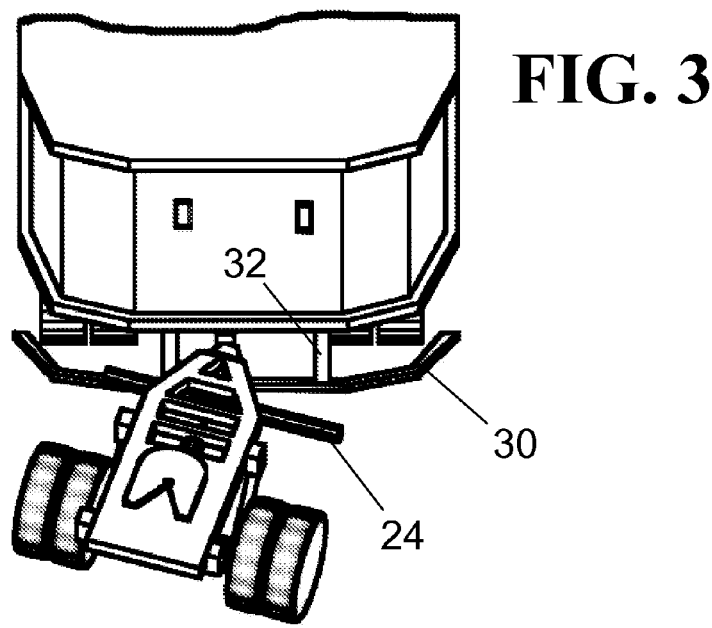
FIG. 3
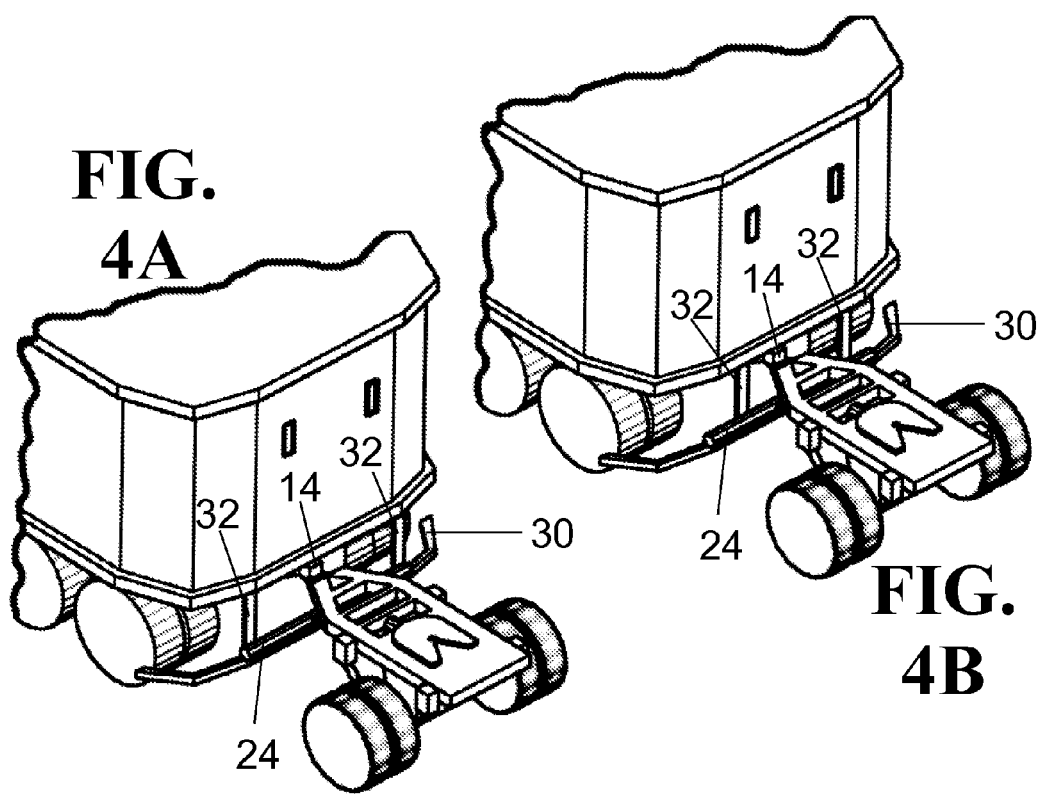
FIG. 4A
FIG. 4B

CONVERTER DOLLY BACKUP DEVICE

CROSS REFERENCE TO RELATED APPLICATION

This application claims priority to U.S. provisional application Ser. No. 60/963,251 entitled "Converter Dolly Backup Device" filed Aug. 3, 2007 by Mark Roush, the contents of which are herein incorporated by reference.

FIELD OF THE INVENTION

The present invention relates generally to the field of tractor-trailer direction guides and more particularly to devices for limiting the rotation of converter dollies about a trailer hitch.

BACKGROUND OF THE INVENTION

A converter dolly is a coupling device used to connect multiple trailers to a single tractor. The device connects to a hitch on a trailer, and includes at least one axle and a fifth-wheel type connector. The fifth-wheel connector engages the kingpin on an additional trailer to form a tandem or triple-trailer rig, thereby enabling a single tractor to haul an additional trailer with more cargo. Although useful for hauling additional cargo, the converter dolly can be difficult and dangerous to maneuver in reverse. Both the hitch connection and the kingpin connection add pivot points that reduce the amount of control a driver has over the reverse operation of the rig. Careful, close, and time consuming arrangement of the trailers is therefore required to successfully couple multiple trailers together. Devices that prevent rotation of the converter dolly relative to the hitch aide in reverse operation of the tractor-trailer rig and decrease the time required to connect multiple trailers together.

Devices that limit the rotation of a dolly about a hitch face multiple challenges. First, the devices must allow the dolly to normally pivot about the hitch during forward moving left and right turns. Second, a device mounted on a converter dolly must be able to function with multiple makes and models of trailer. Devices that connect only to specific trailer parts are severely limited in their functionality. Third, the devices must be light weight and aerodynamic to reduce the cost of transporting the tandem trailer assemblies. Fourth, the device must be robust enough to withstand road spray from the trailer wheels directly in front of the dolly. Fifth, the device should be easy to operate, and preferably operable from within the tractor cab. Sixth, the device is preferably self-contained so that no parts must be added or removed to operate the device. Seventh, the device must be operable with a dolly that is significantly rotated about a trailer hitch.

Many rotation limiting devices have been proposed. For example, in U.S. Pat. No. 5,348,332 issued to Hamilton and U.S. Pat. No. 2,592,219 issued to West et al., chains attached to the trailer are connected to a dolly to prevent rotation during backwards movement. These designs, however, are not operable from within the tractor cab.

Additionally, the inventions of the '332 and '219 patents require that the trailers have specific loops or features to which the chains are connected. Finally, the chains of the '332 and '219 must be manually removed when not in use.

In U.S. Pat. No. 3,421,777 issued to Barker et al., mechanical plungers are manually ratcheted forward from a dolly. The plungers extend to laterally spaced bumpers (22 in FIG. 3 of the '777 patent). Although the mechanism is self contained, the lateral spacing of the bumpers is not standard among trailers and therefore the device would not be operable with many trailer makes and models. The device of the '777 patent is also not functional with a converter dolly that is significantly rotated since the plungers 23 shown in FIG. 3 would pass to the sides of the bumpers 22 (numbers and figures refer to the '777 patent).

In U.S. Pat. No. 4,603,876 issued to Gray and U.S. Pat. No. 3,815,939 issued to Pettay, swinging arms extend from the dolly to multiple contact locations, thus preventing the converter from pivoting substantially when the arms are engaged. These designs, however, require that the trailer has specific features for receiving the swing arms (109 in FIG. 2 of the '876 patent) and that the receiving features be at the same elevation as the converter dolly. The receiving features and elevation requirements limit the utility of the inventions of the '876 and '939 patents to specific makes and models of trailers. As with the other references, the inventions of these patents are not operable with significantly rotated dollies.

Accordingly, an object of the present invention is to provide a device capable of restricting rotation of a converter dolly about a trailer hitch, thus simplifying and expediting trailer coupling.

A further object of the present invention is to provide a device mounted on a converter dolly that is light weight, aerodynamic, and robust.

Another object of the invention is to provide a converter dolly backup device that is functional with many trailer makes and models.

Yet another object of the present invention is to provide a device operable from within a tractor cab, preferably utilizing the standard electrical or air systems on a trailer.

Another object of the present invention is to provide a device that is self contained without components that must be removed or added to operate the device.

Finally, an object of the present invention is to provide a device that is operable with a trailer and dolly that are significantly rotated with respect to each other.

SUMMARY OF THE INVENTION

The present invention provides an improved device to limit the rotation of a converter dolly about a trailer hitch. While the present invention maintains the benefits of other converter dolly backup devices, many other benefits are achieved such as being operable with multiple models of trailers, and with trailers that are significantly rotated with respect to the dollies. The present invention also achieves the important objective of providing a robust, aerodynamic, self contained device capable of preventing rotation of a converter dolly about a trailer hitch.

The backup device is functional with many models of trailers by utilizing a moveable bar, similar in length to the width of the converter dolly that contacts the support structure of a federally required trailer rear underride guard. While, virtually all trailers in the United States have rear underride guards, the lateral locations of support structures for the underride guards are non-standard. The backup device of the present invention is operable with virtually all trailers because the moveable bar provides a large area to contact the underride guard support structure, thus eliminating the need for specific features on the trailer to receive portions of the device. The large area of contact also allows the backup device to be operable with trailers and dollies that are significantly rotated with respect to each other. By connecting to the pressurized brake line or electrical circuitry of the trailer, the backup device may also be operable from within the tractor cab.

These and other advantages will become apparent as this specification is read in conjunction with the accompanying drawings.

BRIEF DESCRIPTION OF THE DRAWINGS

FIG. 3 is a rear perspective view of a converter dolly with a backup device acting upon a trailer that is at a substantial angle relative to the dolly.

FIG. 4A is a rear perspective view of a converter dolly with a backup device acting upon a first trailer that is not at a substantial angle relative to the dolly.

FIG. 4B is a rear perspective view of a converter dolly with a backup device acting upon a second trailer that is substantially un-rotated relative to the dolly, wherein the vertical underride posts of the second trailer are more distant from each other than the posts of the trailer shown in FIG. 4A.

FIG. 13A is a front perspective view of a converter dolly with a retracted backup device having a moveable bar that has angled lateral regions.

FIG. 13B is a front perspective view of a converter dolly with an extended backup device having a moveable bar with angled lateral regions.

FIG. 13C is a side view of a converter dolly with a retracted backup device having a moveable bar with angled lateral regions.

FIG. 13D is a side view of a converter dolly having an extended backup device having a moveable bar with angled lateral regions.

DETAILED DESCRIPTION

The present invention may be used to immobilize any pivot point on trailer rigs, and is particularly suited to immobilize the rotation of a converter dolly about a trailer hitch. The backup device of the present invention may be used with tractor-trailer rigs, hitched trailers, or any road towed cargo container. However, for descriptive purposes, the present invention will be described in use with a leading or first trailer rig pulling a second or trailing trailer rig.

Figure 1:
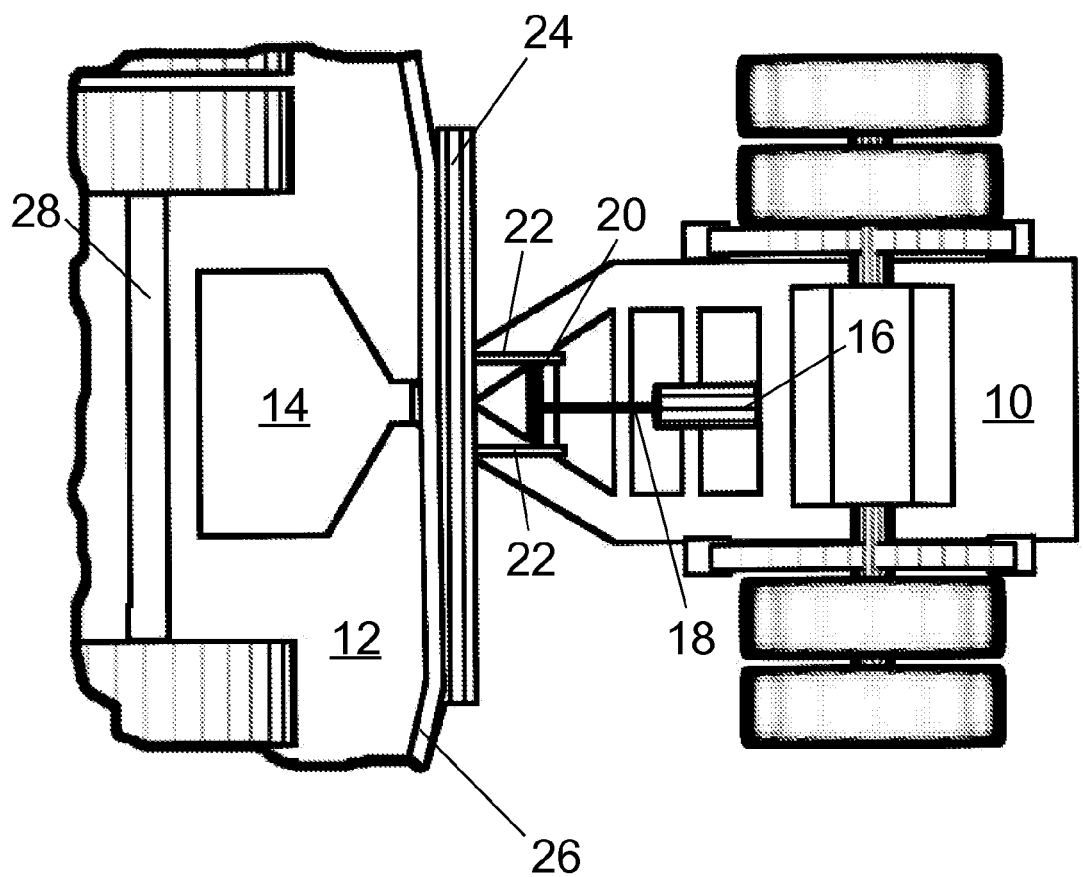
FIG. 1 is a bottom view of a converter dolly with a backup device of the present invention acting upon a partially shown trailer.
Figure 2:
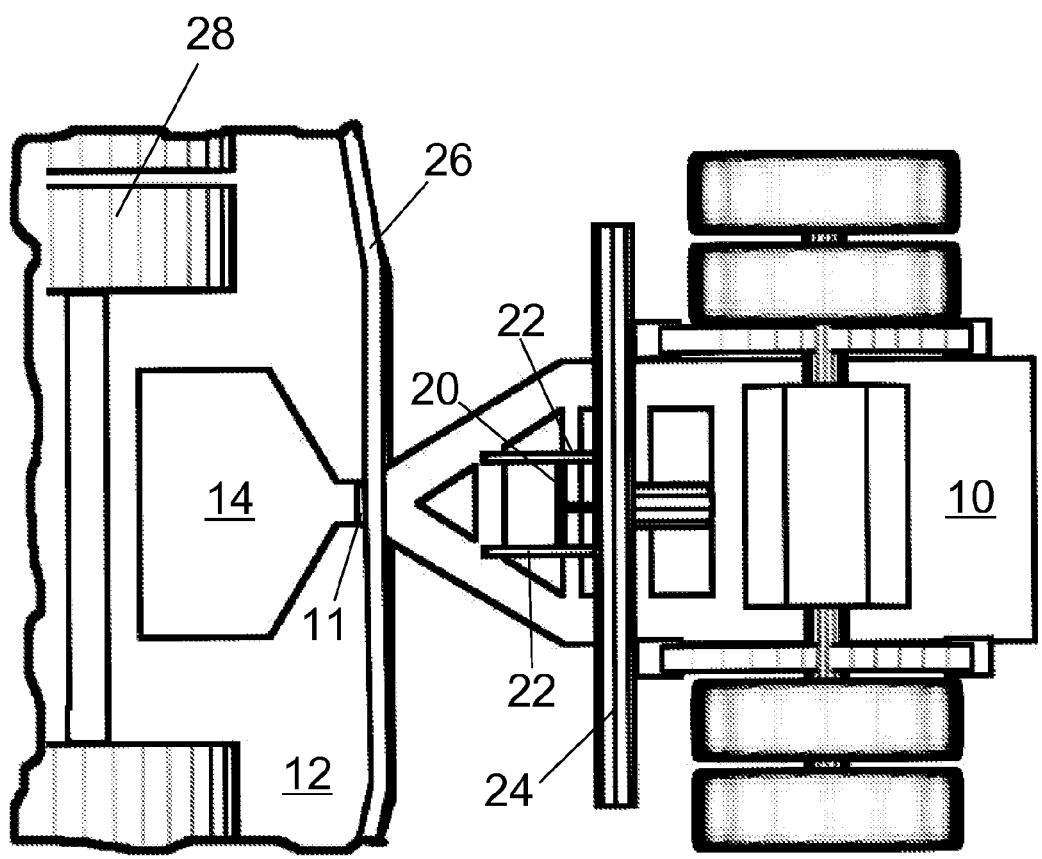
FIG. 2 is a bottom view of a converter dolly with a backup device retracted from a partially shown trailer.

FIGS. 1 and 2 show the underside of a converter dolly 10 with a forward hitch 11 connected to a trailer 12 by means of a rear hitch 14. The dolly has at least two laterally spaced wheels supporting and connecting to a longitudinally extending frame. The frame extends from a forward tongue region having an "A" shape with the forward hitch at or near the peak of the "A" shape. Substantially forming the "A" shape of the tongue region are first and second supports that both longitudinally and laterally extend towards the wheels. Behind the tongue region on the frame is located the fifth wheel region where the frame supports a fifth wheel connector specifically adapted for receiving a kingpin connection of the trailing or second trailer. The converter dolly 10 has a backup device comprising an actuator 16 with a movable shaft 18 or rod connected to a horizontal arm 20 attached to two leverage arms 22 that are connected to a straight bar 24. Alternatively the shaft may be directly connected to the straight laterally extending bar or to the leverage arms. In FIG. 1, the straight bar 24 is contacting a trailer rear underride guard 26 located behind a trailer wheel assembly 28. Conversely, in FIG. 2, the straight bar 24 is in a retracted position.

When the straight bar 24 is pressed against the rear underride guard 26, the straight bar 24 exerts a force upon the vertical member or members of the underride guard which causes the vertical member to exert an equal and opposite force upon the dolly assembly. The force acting upon the dolly exerts a torque force about the forward hitch and forces the dolly into a substantially un-rotated orientation shown in FIG. 2. When the dolly is in a substantially un-rotated orientation and the backup device is in the extended position, the first and second vertical member prevent rotation of the trailer by exerting forces that cause substantially equal and opposite torques upon the dolly. Any movement rotation of the dolly causes an inequality of forces exerted that results in the dolly being forced back to the un-rotated position. In addition to moving the bar between the illustrated extended and retracted positions, the actuator 16 is capable of moving the straight bar beyond the extended position shown in FIG. 1 in the absence of a trailer.

Alternatively, the actuator may move the laterally extending bar to numerous positions located between the fully retracted and the extended state. The positioning of the tongue region above the bar and rotation arm may prevent both the arm and bar from rotating/extending to a location that is substantially above the frame of the dolly. The wide lateral area and wide range of movement of the bar allows the converter dolly backup device to be operable in a wide range of conditions and with many trailer makes and models.

The actuator of the backup device may include, but is not limited to, an air pressure driven piston, a hydraulic fluid driven piston, or an electrically driven device. The rotation arms may be attached to the converter dolly or integrally formed as part of the dolly.

The materials used may include, but are not limited to, wood, metals, carbon fibers, and polymers. The individual components may be of a uniform or variant composition. A protective coating may be added to any material to protect it from road spray and general corrosion. Galvanization may also be used to protect the components of the backup device. Lubrication of any or all moving parts with synthetic or natural products is within the scope of the invention.

FIGS. 3, 4A, and 4B show rear perspective views of trailers connected to converter dollies 10 with backup devices. The trailer rear underride guard 26 has horizontal underride portions 30 and vertical members 32. The converter dolly 10 shown in FIG. 3 is rotated about the rear hitch 14, while the converter dolly of FIG. 4A is straight with respect to the rear hitch 14. The rotated dolly of FIG. 3 has a backup device with a straight bar 24 that is only contacting one vertical member while the straight dolly of FIG. 4A has a backup device that is contacting two vertical underride members. As a result of uneven contact about the rear hitch, a torque is exerted upon the converter dolly of FIG. 3 that acts to straighten the dolly relative to the trailer. The dolly includes laterally spaced wheels and a frame longitudinally extending from the wheels to a forward hitch adapted for connecting with the rear hitch 14 of the trailer 12. The dolly also has a fifth wheel type connector for accepting the kingpin of a rear trailer.

The vertical members shown in FIG. 4A are less separated than the vertical members of FIG. 4B which causes different portions of the laterally extending straight bars to contact the vertical members. The laterally extending bar has a width that is substantially greater than the rearward facing surfaces of the vertical members such that the bar is able to function with vertical members mounted at numerous different locations. The rearward facing surfaces of the vertical members may be specifically adapted to press against a laterally extending bar of a backup device. However, special adaptations are typically not required since the rearward surfaces of underride guards are already adapted to absorb the impact of a vehicle crashing into the trailer.

Since the U.S. Department of Transportation requires trailers to have rear underride guards, and underride guards typically connect to the trailer via vertical members, the laterally extending bar of the backup device is functional with nearly all street legal trailers. Since the vertical members of the underride guards are already standard, modifications to the leading trailer are typically not needed in order for it to function with the backup device.

Figure 5:
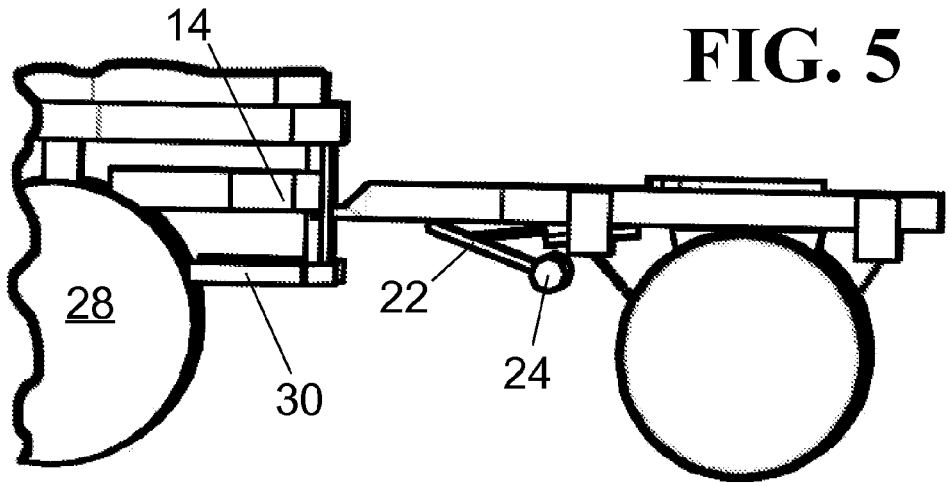
FIG. 5 is a side view of a converter dolly with a backup device retracted from a trailer.
Figure 6:
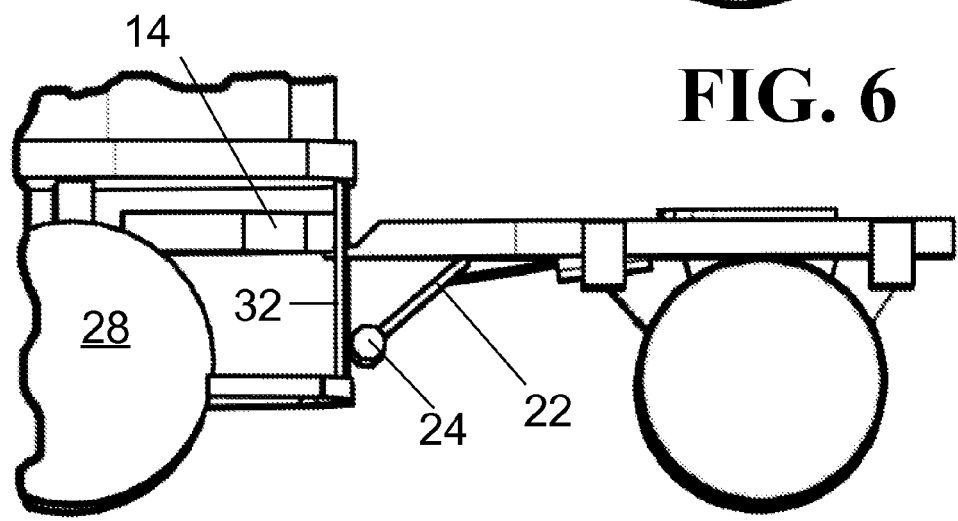
FIG. 6 is a side view of a converter dolly with a backup device extended to and acting upon a trailer.
Figure 7:
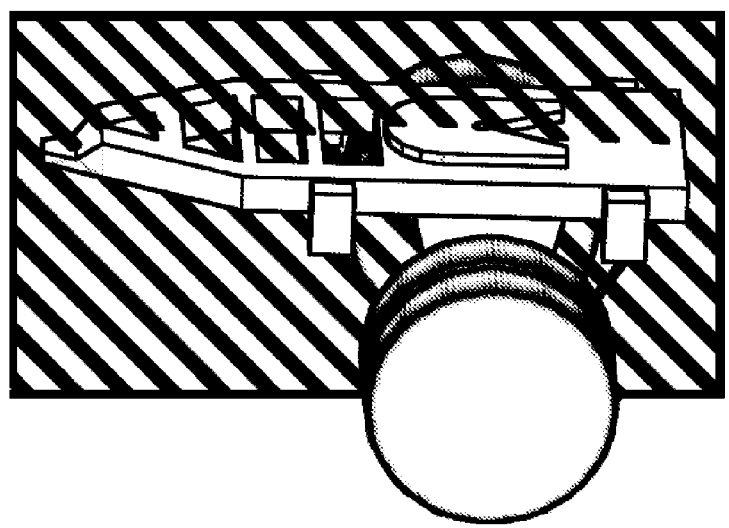
FIG. 7 is a top perspective view of a dolly with a vertical geometric plane bisecting the dolly and intersecting both the forward hitch and $5^{th}$ wheel connector on the dolly.
Figure 8:
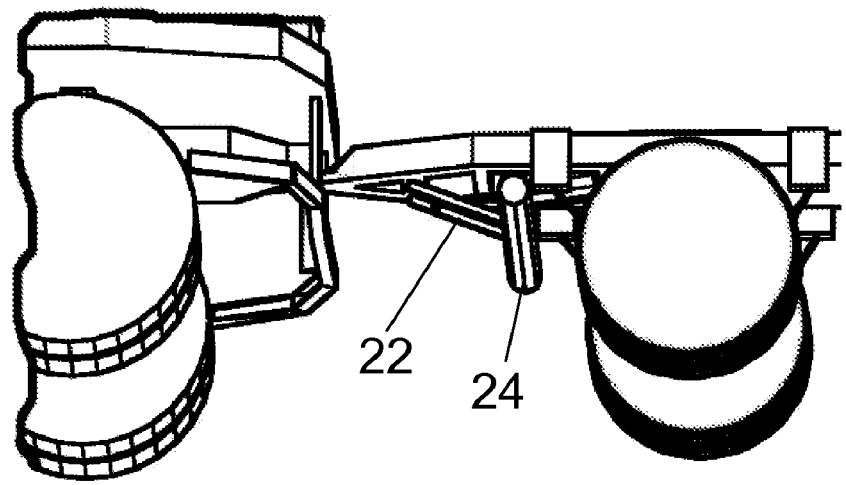
FIG. 8 is a side perspective view of a converter dolly with a backup device retracted from a trailer.
Figure 9:
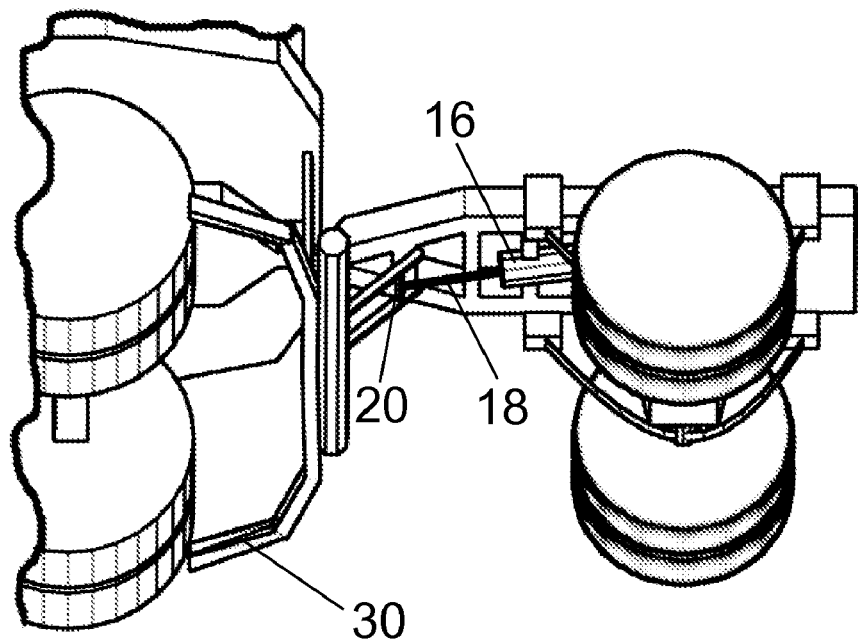
FIG. 9 is a side perspective view of a converter dolly with a backup device extending to and acting upon a trailer.

FIGS. 5 and 6 show side views of converter dollies with retracted and extended backup devices, respectively. FIG. 7 shows a top perspective view of the converter dolly with a geometric plane perpendicular to the laterally extending wheels. The vertical geometric plane shown bisects the dolly and includes portions of the forward hitch and the fifth wheel connector. FIGS. 8 and 9 show bottom perspective views of backup devices. The leverage arm 22 moves the straight bar 24 back a substantial distance from the vertical underride portions when the backup device is not in use. The substantial separation of the bar and underride guard permits the trailer and converter dolly assembly to pivot about the trailer hitch during normal forward movement, such as when the tractor-trailer rig is making a right turn onto a perpendicular street.

The inventors contemplate several alterations and improvements to the disclosed invention. Other alterations, variations, and combinations are possible that fall within the scope of the present invention. Although the preferred embodiment of the present invention has been described, those skilled in the art will recognize other modifications that may be made that would nonetheless fall within the scope of the present invention.

Figure 10A:
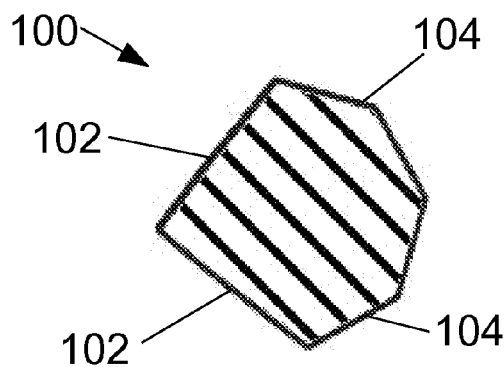
FIG. 10A is a side view of an aerodynamic moveable bar with a highly tapered leading edge and an angled trailing surface
Figure 10B:
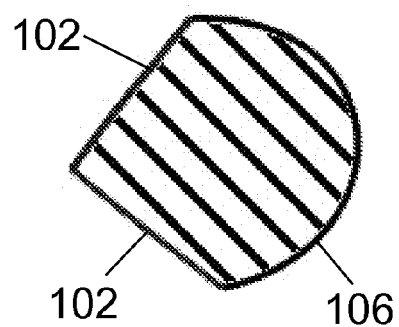
FIG. 10B is a side view of an aerodynamic moveable bar with a highly tapered leading edge and an curved trailing surface
Figure 11A:
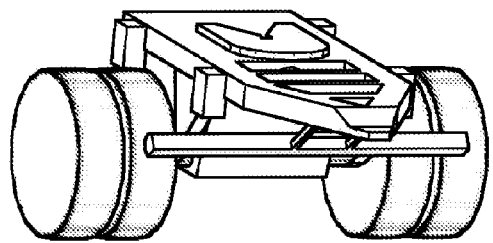
FIG. 11A is a top perspective view of a converter dolly with a backup device having a moveable bar designed to be aerodynamic while in the retracted position.
Figure 11B:
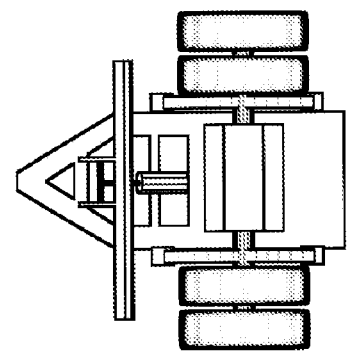
FIG. 11B is a bottom view of a converter dolly with a backup device having a moveable bar designed to be aerodynamic while in the retracted position.
Figure 11C:
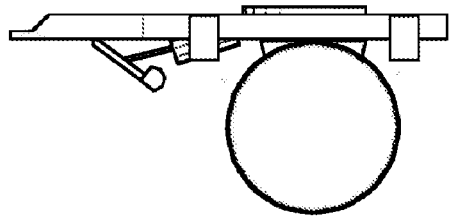
FIG. 11C is a side view of a converter dolly with a backup device having a moveable bar designed to be aerodynamic while in the retracted position.
Figure 11D:
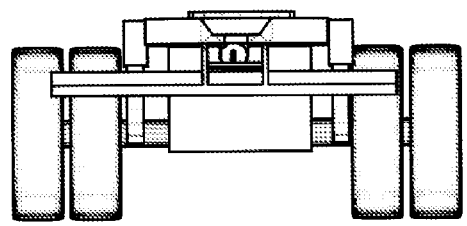
FIG. 11D is a front view of a converter dolly with a backup device having a moveable bar designed to be aerodynamic while in the retracted position.

FIG. 10A illustrates the cross section of an aerodynamic bar 100 with fore angled surfaces 102 on the front of the bar that reduce both air resistance and road debris accumulation. Behind the fore angled surfaces on the bar are aft angled surfaces 104 that serve to reduce base drag as the rig moves. FIG. 10B shows a cross section of an aerodynamic bar with fore angled surfaces 102 and an aft curved surface 106. FIGS. 11A-11D show a front perspective view, bottom view, side view, and front view of a converter dolly with a backup device with an aerodynamic bar. As shown, the aerodynamic bar is positioned so that it is most aerodynamic when moved in a forward direction while in a retracted orientation. Since the tractor-trailer-dolly rig is only able to moved backwards at very slow speeds, the aerodynamic features of the bar may be further optimized for forward movement without substantial regard to backwards movement.

Figure 12:
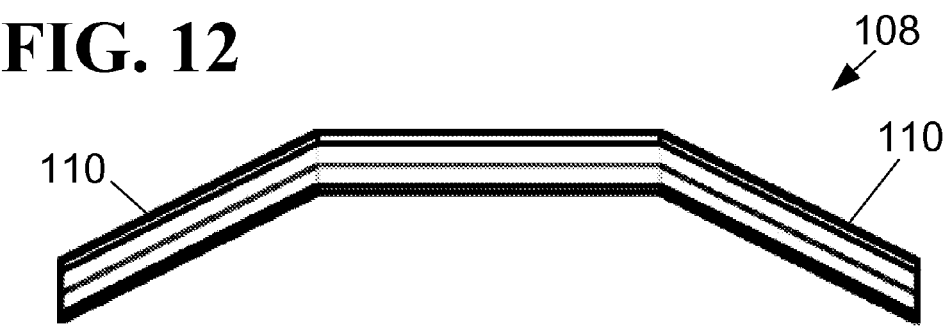
FIG. 12 is a top view of a moveable bar that has angled lateral regions.
Figure 12:
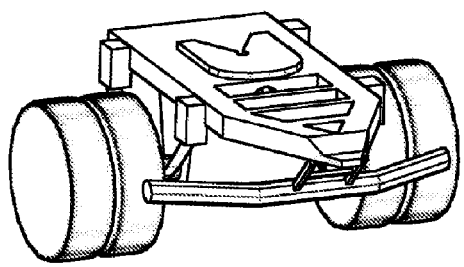
Figure 12:
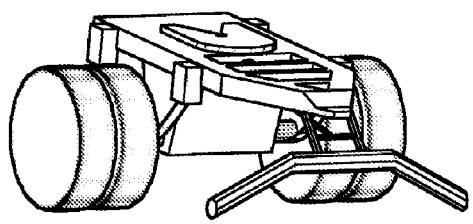
Figure 12:
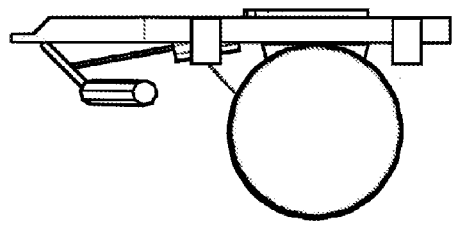
Figure 12:
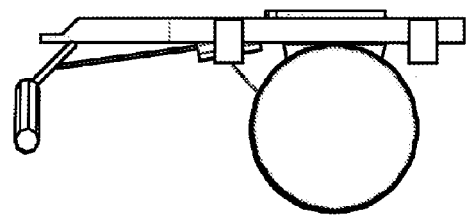
Figure 13E:
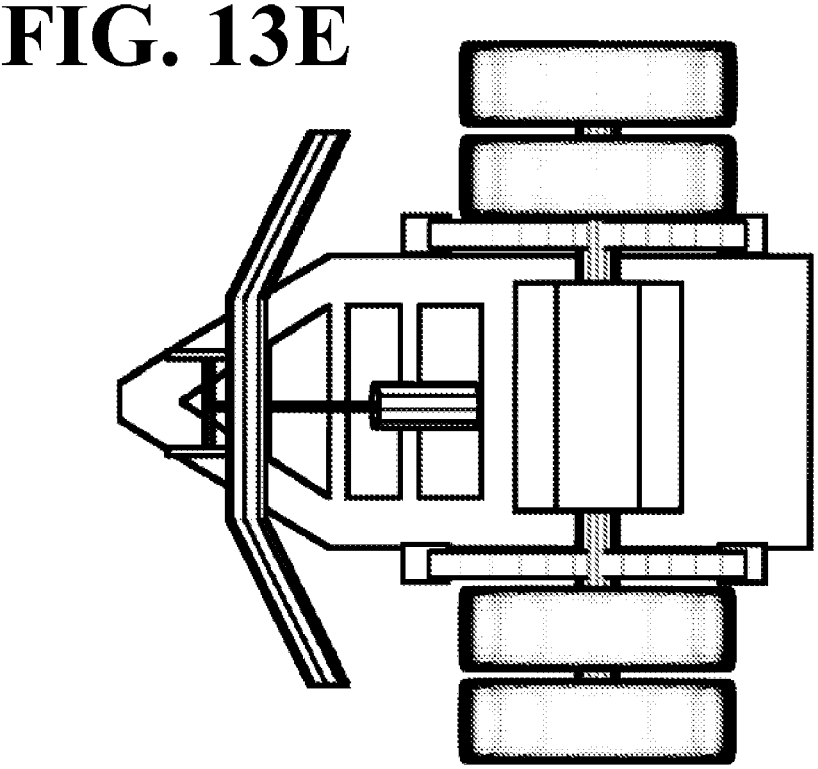
FIG. 13E is a bottom view of a converter dolly with a retracted backup device having a moveable bar with angled lateral regions.
Figure 13F:
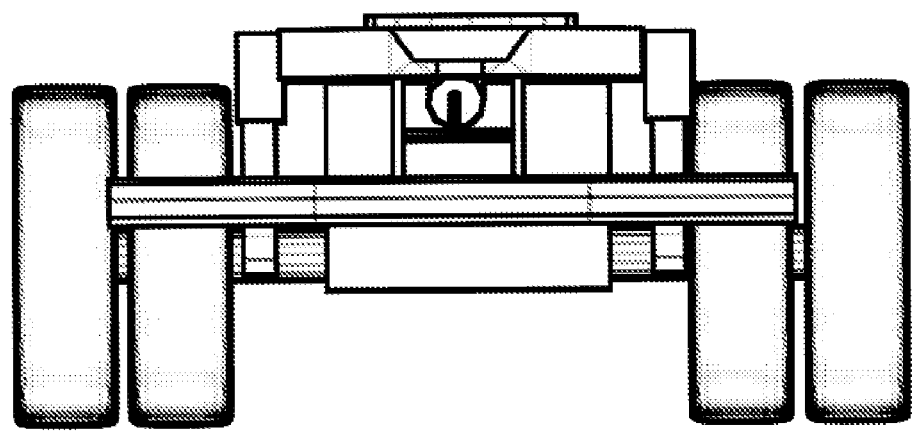
FIG. 13F is a front view of a converter dolly with a retracted backup device having a moveable bar with angled lateral regions.

FIG. 12 illustrates the top view of an angled bar 108 with side angled surfaces 110 on the front of the bar that reduce air resistance and debris accumulation on the bar. In addition to reducing air resistance, the angled surfaces allow the bar to be positioned closer to the trailer underride guard when in the retracted orientation. The angled surfaces act to limit that variability of the separation between the converter dolly and the trailer based on rotation of the dolly. FIGS. 13A through 13F show views of a converter dolly with a backup device that has an angled bar. FIGS. 13A, 13C, 13E, and 13F show a backup device with a bar in the retracted orientation while FIGS. 12B and 13D show a bar in the extended orientation.

Figure 14:
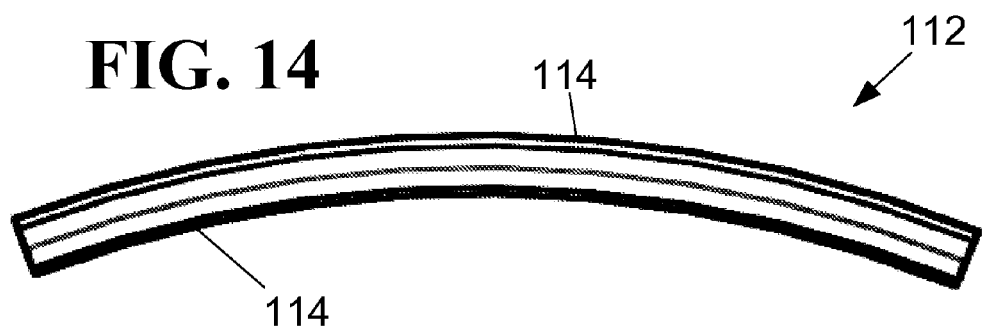
FIG. 14 is a top view of a rounded, laterally extending, movable bar.
Figure 15A:
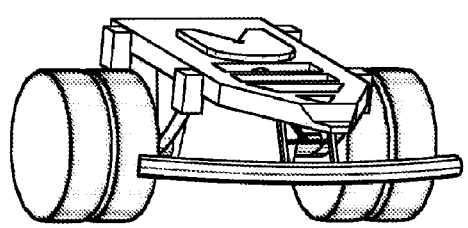
FIG. 15A is a front perspective view of a converter dolly with a backup device having a laterally extending rounded movable bar.
Figure 15B:
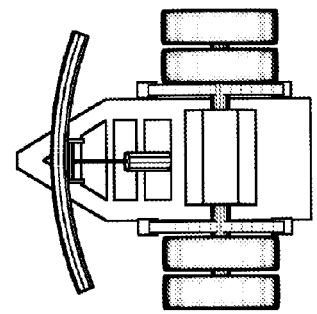
FIG. 15B is a bottom view of a converter dolly with a backup device having a rounded movable bar.
Figure 15C:
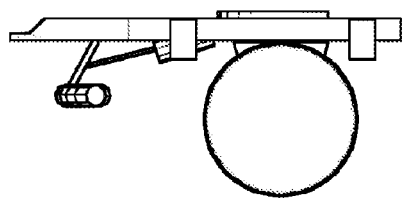
FIG. 15C is a side view of a converter dolly with a backup device having a rounded movable bar.
Figure 15D:
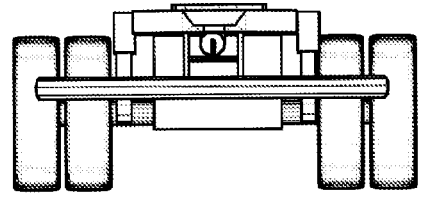
FIG. 15D is a front view of a converter dolly with a backup device having a rounded movable bar.

FIG. 14 illustrates a top view of a laterally rounded bar 112 with laterally rounded surfaces 114 that reduce air resistance and debris accumulation as the tractor-trailer rig moves. In addition to reducing air resistance, the rounded surfaces allow the bar to be positioned closer to the trailer underride guard when in the retracted position. The rounded surfaces act to maintain a substantially constant separation between the converter dolly and the trailer regardless of dolly rotation. FIGS. 15A-15D show a front perspective view, bottom view, side view, and front view of a converter dolly with a backup device that comprises a laterally rounded bar.

Figure 16:
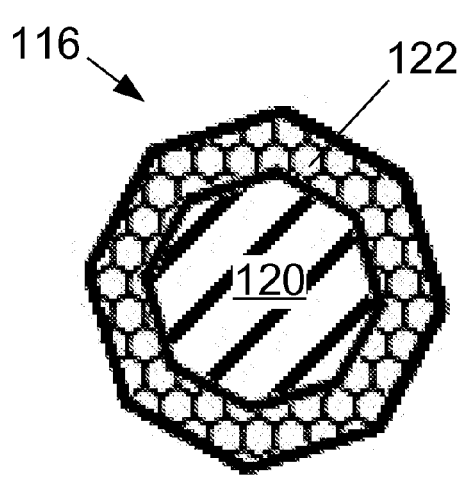
FIG. 16 is a side cross section of an octagonal movable bar having an inner core and an outer layer.
Figure 17:
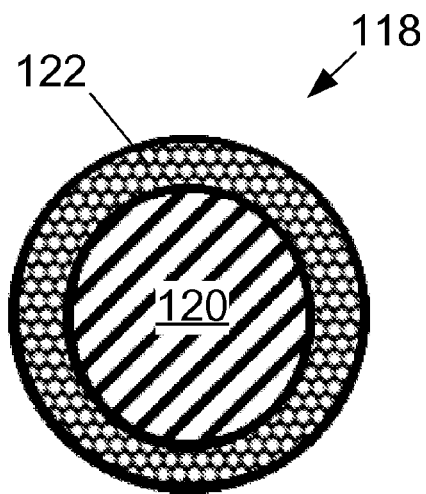
FIG. 17 is a side cross section of a rounded movable bar with an inner core and an outer layer.
Figure 18:
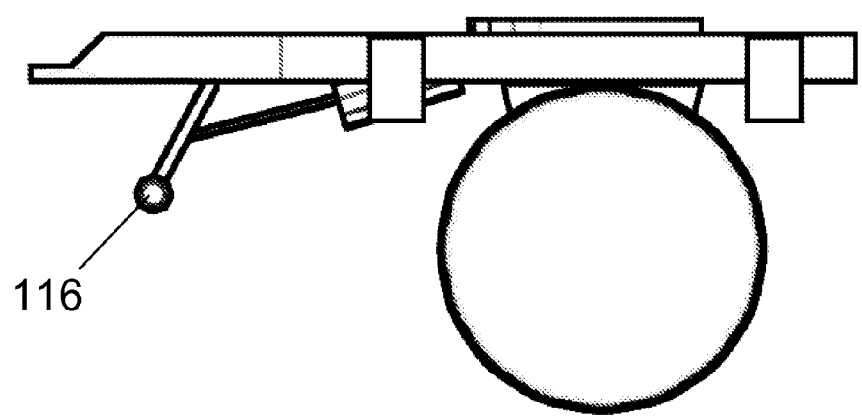
FIG. 18 is a side view of a converter dolly having a backup device with a laterally extending movable bar comprising an inner core and an outer layer.

FIG. 16 illustrates the cross section of an octagonal composite bar 116 while FIG. 17 shows a rounded composite bar 118. The composite bars have an inner core 120 and an outer casing 122. The inner core 120 may be substantially empty in order to reduce the weight of the bar. Conversely, the inner core may act to provide structural rigidity to the bar while the outer casing acts as a cushion between the inner core and the trailer rear underride guard. A cushioned outer core may aid the bar in gripping the vertical members of the underride guard when adverse weather conditions have made the vertical members slick. FIG. 18 shows a view of a converter dolly with a backup device that has an octagonal composite bar.

Figure 19:
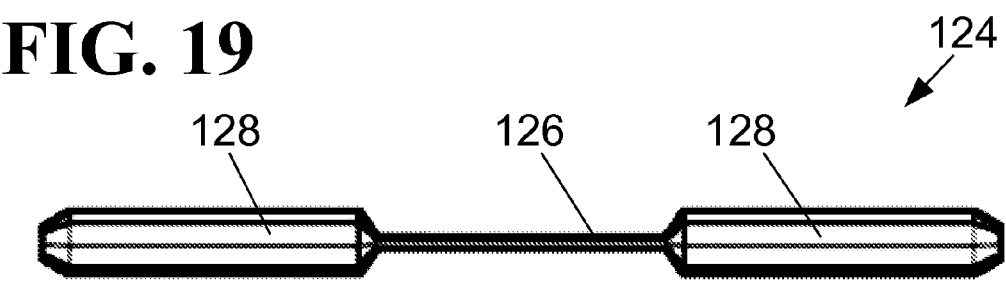
FIG. 19 is a top view of a pugil-stick shaped movable bar having a thin middle section and two thicker lateral sections.
Figure 20A:
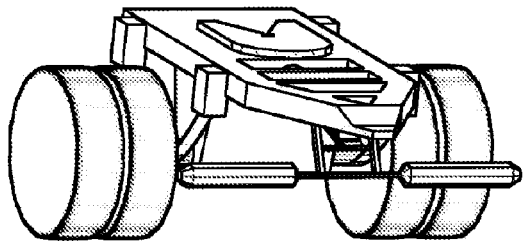
FIG. 20A is a front perspective view of a converter dolly having a backup device with a laterally extending pugil-stick shaped movable bar having a thin middle section and two reinforced lateral sections.
Figure 20B:
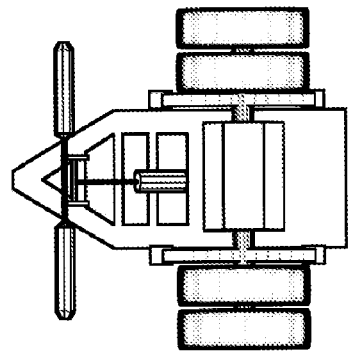
FIG. 20B is a bottom view of a converter dolly having a backup device with a pugil-stick shaped movable bar having a thin middle section and two thicker lateral sections.
Figure 20C:
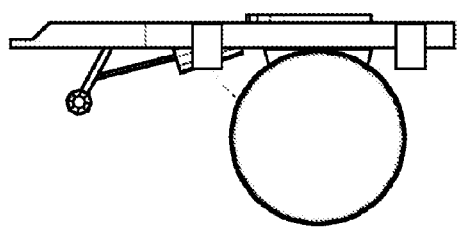
FIG. 20C is a side view of a converter dolly having a backup device with a pugil-stick shaped movable bar with a thin middle section and two thicker lateral sections.
Figure 20D:
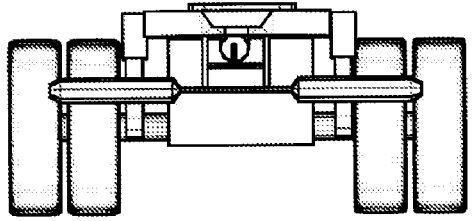
FIG. 20D is a front view of a converter dolly having a backup device with a pugil-stick shaped movable bar with a thin middle section and two thicker lateral sections.

FIG. 19 shows a pugil-stick style bar 124 with a thin middle section 126 and two reinforced lateral sections 128 with diameters that are greater than the diameter of the bar in the middle section. The thin middle section 126 reduces the total weight of the bar while the lateral sections are reinforced at the locations most likely to contact portions of the trailer underride guard. FIGS. 20A through 20D show a front perspective view, bottom view, side view, and front view of a converter dolly with a backup device that comprises a pugil-stick style bar. The areas of increased thickness may be formed with a uniform composition, or they may be formed from multiple materials. For example, a laterally extending bar with a pugil-stick configuration could be formed by attaching circular cushions to the ends of a thin metal bar of uniform thickness.

Figure 21:
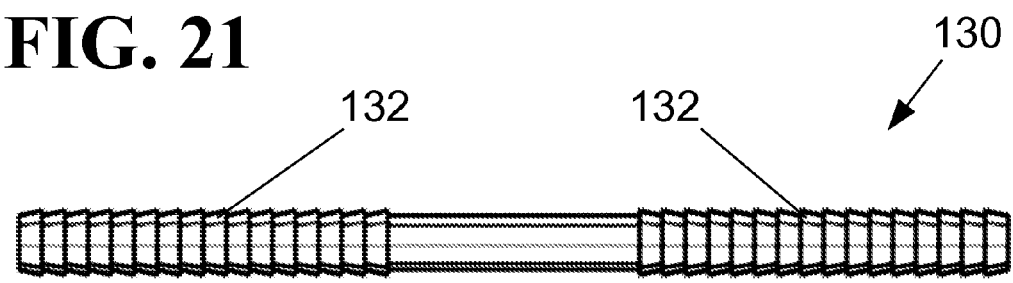
FIG. 21 is a top view of a moveable bar with saw tooth protrusions circumscribed about the bar.
Figure 22A:
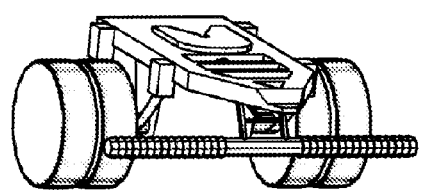
FIG. 22A is a front perspective view of a converter dolly having a backup device with a moveable bar that includes two groups of saw tooth protrusions circumscribed about the bar.
Figure 22B:
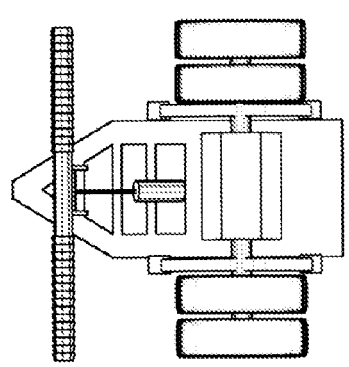
FIG. 22B is a bottom view of a converter dolly having a backup device with a moveable bar that includes saw tooth protrusions circumscribed about the bar.
Figure 22C:
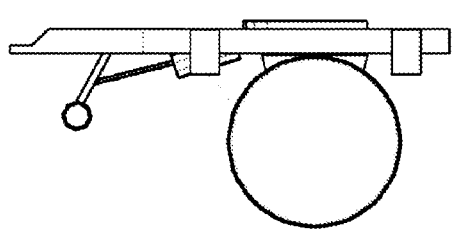
FIG. 22C is a side view of a converter dolly having a backup device with a moveable bar comprising saw tooth protrusions circumscribed about the bar.
Figure 22D:
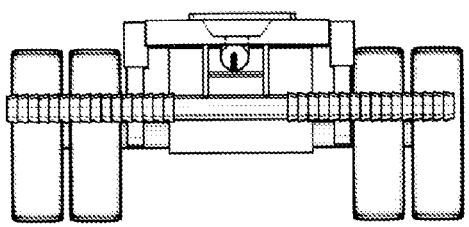
FIG. 22D is a front view of a converter dolly having a backup device with a moveable bar including saw tooth protrusions.

FIG. 21 is a top view of a saw toothed bar 130 with saw tooth protrusions 132 circumscribed about the bar. The saw tooth protrusions are angled such that the tapered areas of each tooth is located at a more lateral region of the bar. The saw tooth protrusions act as a ratcheting surface when the backup device is used on a substantially rotated converter dolly. The saw tooth protrusions in contact with a trailer rear underride guard prevent the dolly from pivoting into a more rotated angle while allowing rotation into a less rotated angle.

FIGS. 22A-22D show a front perspective view, bottom view, side view, and front view of a converter dolly with a backup device that comprises a saw toothed bar. The protrusions on opposite lateral sides of the laterally extending bar are inversely oriented to each other such that the teeth contact the vertical members in a ratcheting manner when the dolly is oriented both clockwise and counter-clockwise to the leading trailer. Although not required to practice the invention, the illustrated embodiment of the invention shows two sets of saw tooth protrusions that are substantially symmetrical to each other about a vertical geometric plane that intersects the fifth wheel connector and forward hitch.

Figure 23:
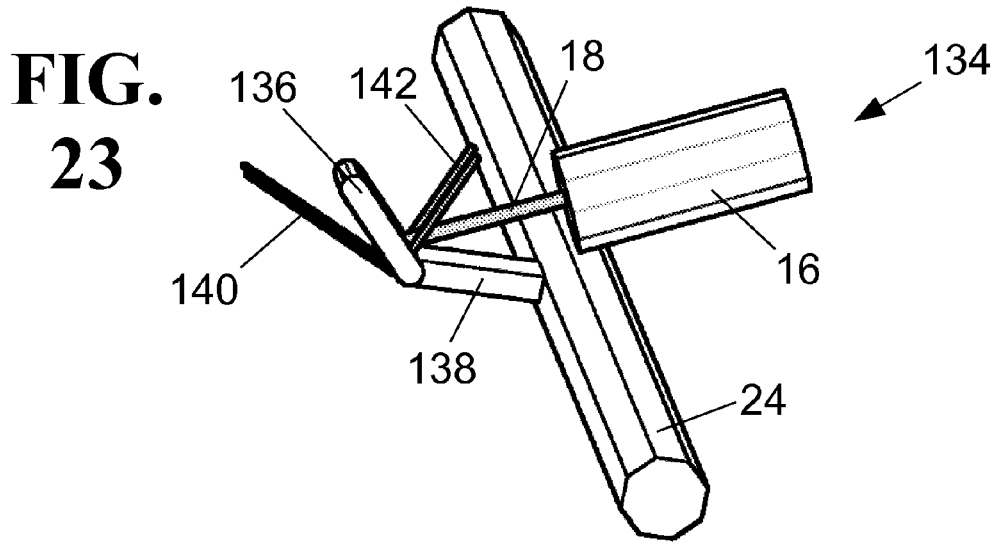
FIG. 23 is a perspective view of a backup device with an actuator, a bar, and a jointed rotation arm comprising a humeral arm, a radial arm, a set of fore tendons, and a set of aft tendons.
Figure 24A:
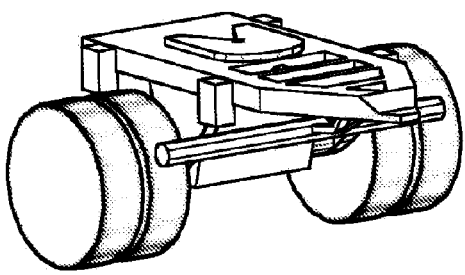
FIG. 24A is a front perspective view of a converter dolly with a backup device comprising an actuator, a bar, and a jointed rotation arm having a humeral arm, a radial arm, a set of fore tendons, and a set of aft tendons.
Figure 24B:
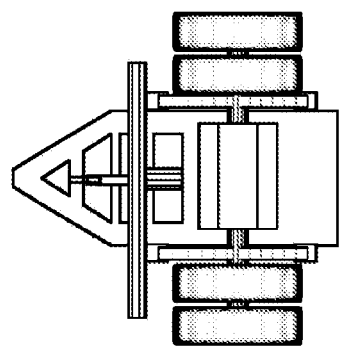
FIG. 24B is a bottom view of a converter dolly with a backup device comprising an actuator, a bar, and a jointed rotation arm having a humeral arm, a radial arm, a set of fore tendons, and a set of aft tendons.
Figure 24C:
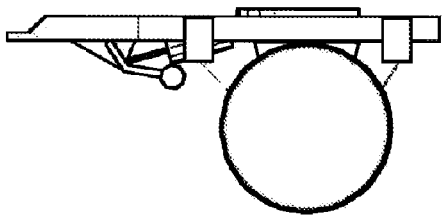
FIG. 24C is a side view of a converter dolly with a backup device comprising an actuator, a bar, and a jointed rotation arm having a humeral arm, a radial arm, a set of fore tendons, and a set of aft tendons.
Figure 24D:
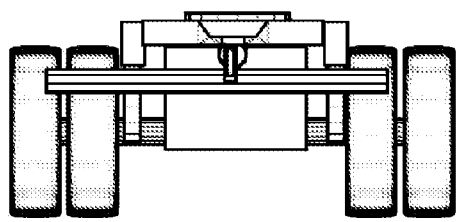
FIG. 24D is a front view of a converter dolly with a backup device comprising an actuator, a bar, and a jointed rotation arm having a humeral arm, a radial arm, a set of fore tendons, and a set of aft tendons.

FIG. 23 is a perspective view of a backup device with a jointed rotation arm 134 comprising a humeral arm 136, a radial arm 138, a set of fore tendons 140, and a set of aft tendons 142. The tendons are substantially inelastic and connected to both the converter dolly and the radial arm 138. The radial arm rotates about a joint with the humeral arm 136 of the backup device. The forward movement of the humeral arm results in a tightening of the aft tendon that causes a forward rotation of the radial arm. The jointed rotation arm allows a substantial movement of the straight bar with minimal movement of the shaft. In an exemplary embodiment of the invention, metal cables are used to create the tendons. FIGS. 24A-24D show a front perspective view, bottom view, side view, and front view of a converter dolly with a backup device that has a jointed rotation arm.

Figure 25:
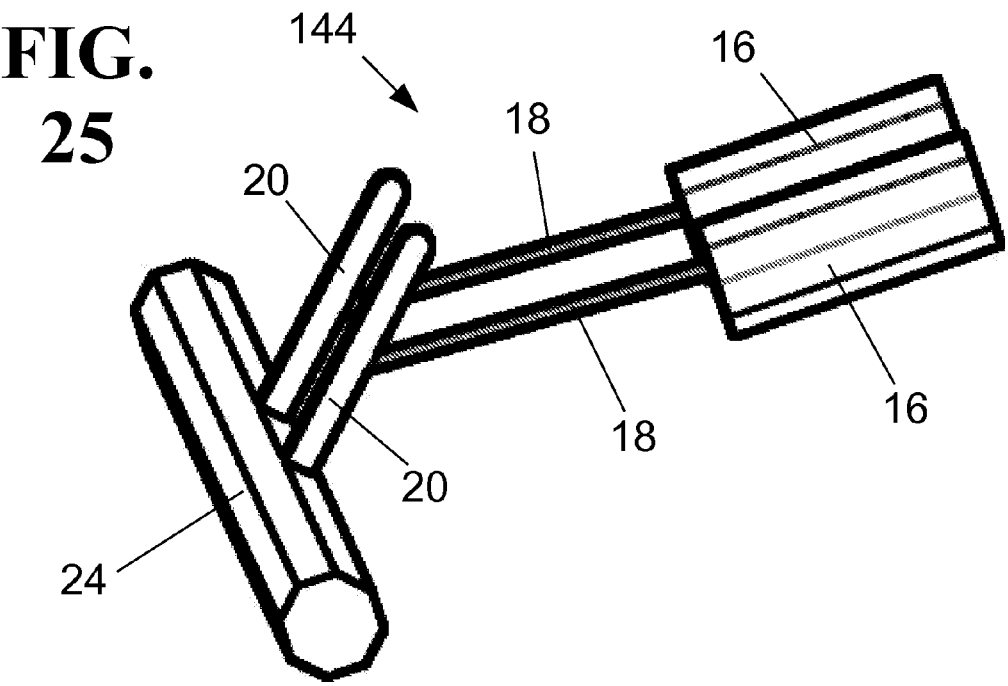
FIG. 25 is a perspective view of a backup device comprising two actuators, a bar, and two rotation arms connected to the bar
Figure 26A:
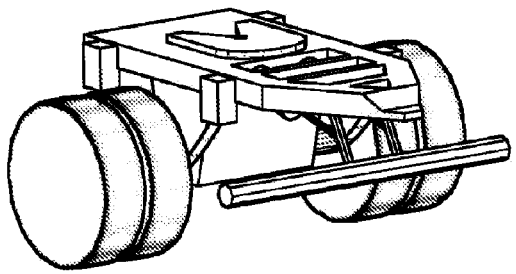
FIG. 26A is a front perspective view of a converter dolly with a backup device comprising two actuators, a bar, and two rotation arms.
Figure 26B:
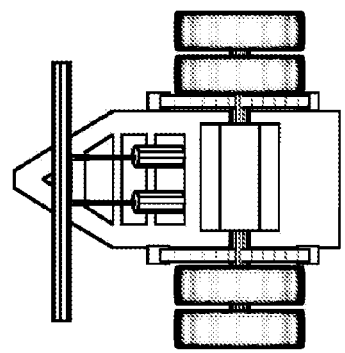
FIG. 26B is a bottom view of a converter dolly with a backup device comprising two actuators, a bar, and two rotation arms.
Figure 26C:
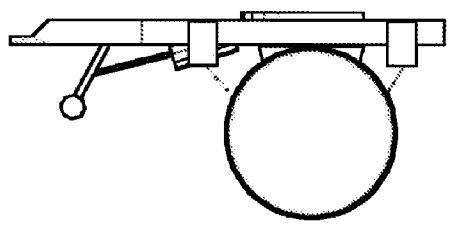
FIG. 26C is a side view of a converter dolly with a backup device comprising two actuators, a bar, and two rotation arms.
Figure 26D:
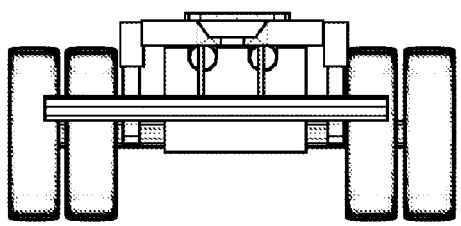
FIG. 26D is a front view of a converter dolly with a backup device comprising two actuators, a bar, and two rotation arms.

FIG. 25 is a perspective view of a dual bar backup device 144 comprising two actuators 16, two shafts 18, and two rotation arms 20 connected to a bar 24. The use of two rotation arms substantially increases the backup device's ability to resist bending when a force is exerted upon a lateral portion of the bar. Additionally, less force must be exerted by each actuator when multiple actuators are utilized. Although two sets of actuators, shafts, and rotation arms are shown in FIG. 25, a greater number of sets could be used and would be within the scope of the invention. FIGS. 26A through 26D show a front perspective view, bottom view, side view, and front view of a converter dolly with a backup device that has two actuators and two rotation arms.

Figure 27:
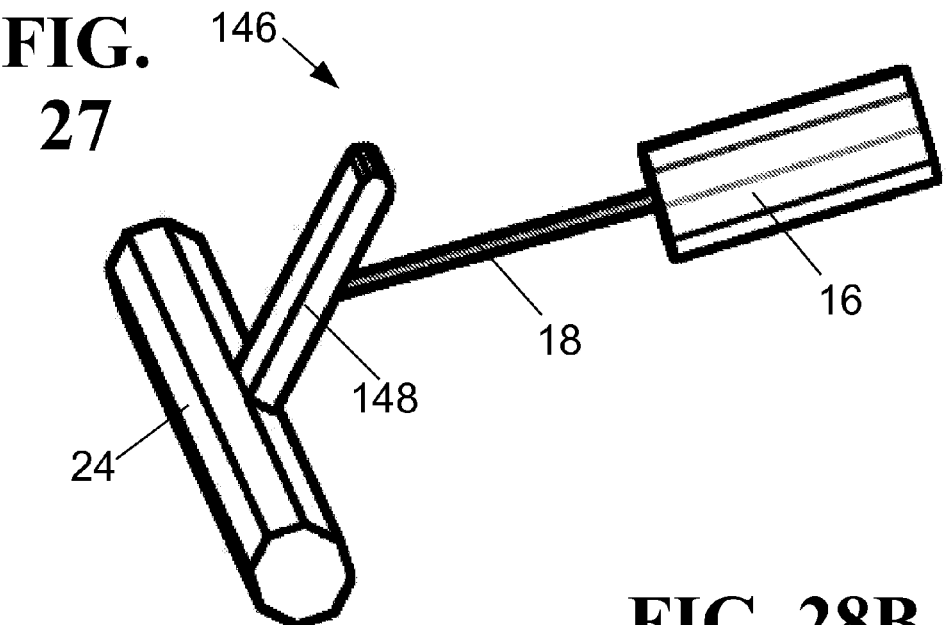
FIG. 27 is a perspective view of a backup device comprising an actuator, a bar, and a single reinforced rotation arm.
Figure 28A:
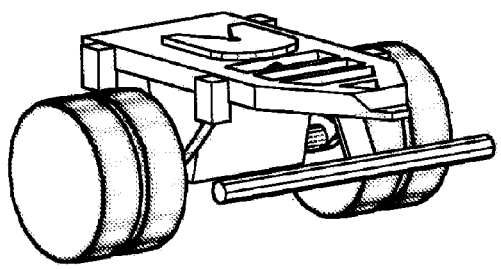
FIG. 28A is a front perspective view of a converter dolly with a backup device comprising an actuator, a bar, and a single reinforced rotation arm.
Figure 28B:
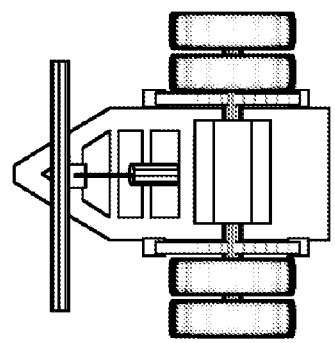
FIG. 28B is a bottom view of a converter dolly with a backup device comprising an actuator, a bar, and a single reinforced rotation arm.
Figure 28C:
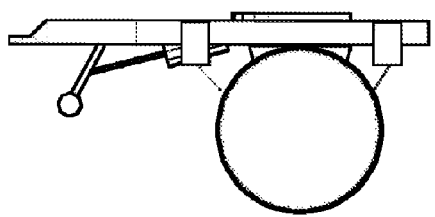
FIG. 28C is a side view of a converter dolly with a backup device comprising an actuator, a bar, and a single reinforced rotation arm.
Figure 28D:
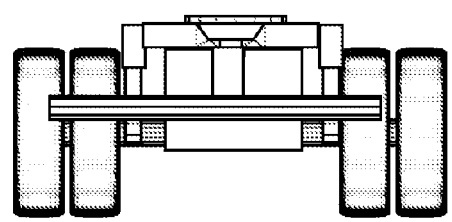
FIG. 28D is a front view of a converter dolly with a backup device comprising an actuator, a bar, and a single reinforced rotation arm.

FIG. 27 is a perspective view of a reinforced backup device 146 comprising an actuator 16, a bar 24, and a single reinforced rotation arm 148. The reinforced rotation arm 148 has an increased width and is constructed from robust materials such as carbon fiber or steel. The bar utilized with the reinforced rotation arm may also be significantly reinforced. FIGS. 28A-28D show a front perspective view, bottom view, side view, and front view of a converter dolly with a backup device having a reinforced rotation arm.

Figure 29:
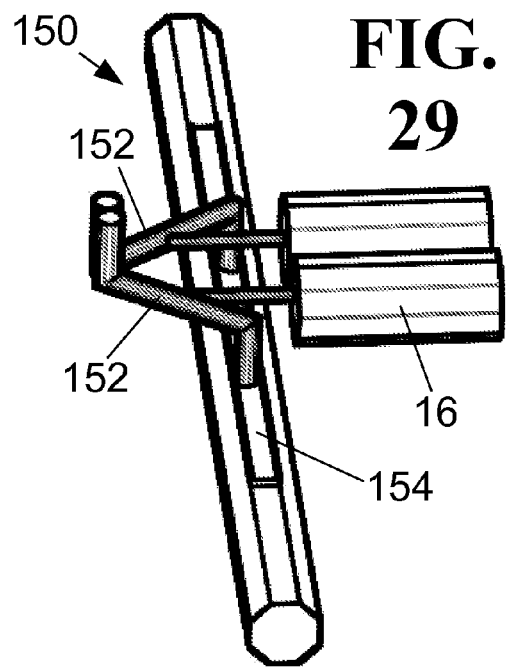
FIG. 29 is a perspective view of a backup device comprising two actuators, two laterally rotating arms, and a bar having an arm receiving path.
Figure 30A:
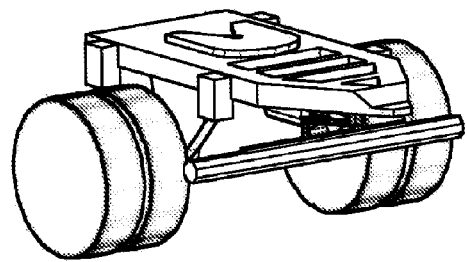
FIG. 30A and FIG. 30B are perspective views of a converter dolly with a backup device comprising two actuators, two laterally rotating arms, and a bar having an arm receiving path.
Figure 30C:
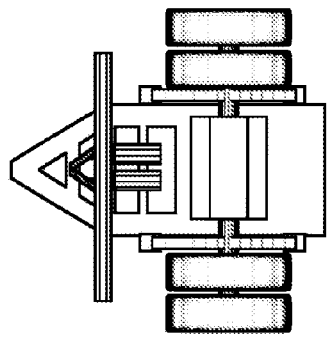
FIG. 30C is a bottom view of a converter dolly with a backup device comprising two actuators, two laterally rotating arms, and a bar having an arm receiving path about which the rotating arms connect.
Figure 30B:
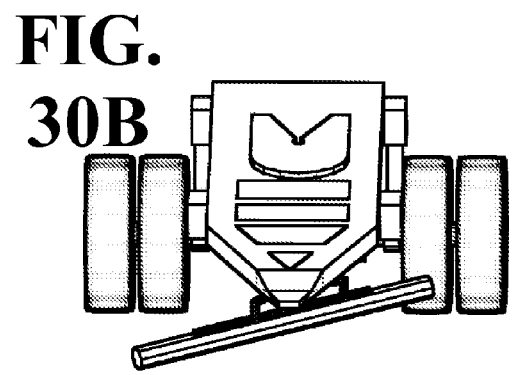
Figure 30D:
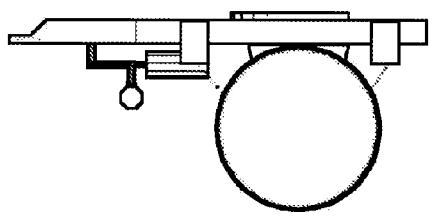
FIG. 30D is a side view of a converter dolly with a backup device comprising two actuators, two laterally rotating arms, and a bar having an arm receiving path.
Figure 30E:
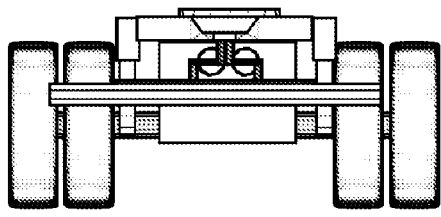
FIG. 30E is a front view of a converter dolly with a backup device having two actuators, two laterally rotating arms, and a bar having an arm receiving path.

FIG. 29 is a perspective view of a laterally rotating backup device 150 comprising two actuators 16, two laterally acting rotation arms 152, and a bar having a rotation arm receiving path 154. FIGS. 30A through 30E show a side perspective view, front perspective view, bottom view, side view, and front view of a converter dolly with a laterally acting backup device. The laterally acting rotation arms 152 move to and from the trailer underride guard without a substantial amount of vertical movement thus allowing the backup device to be located at a low position on the converter dolly. The laterally acting rotation arms and rotation arm receiving path allows the bar to be rotated with respect to the converter dolly as shown in FIG. 30B. Such a rotation may be beneficial when the converter dolly is substantially rotated with respect to the trailer.

Figure 31:
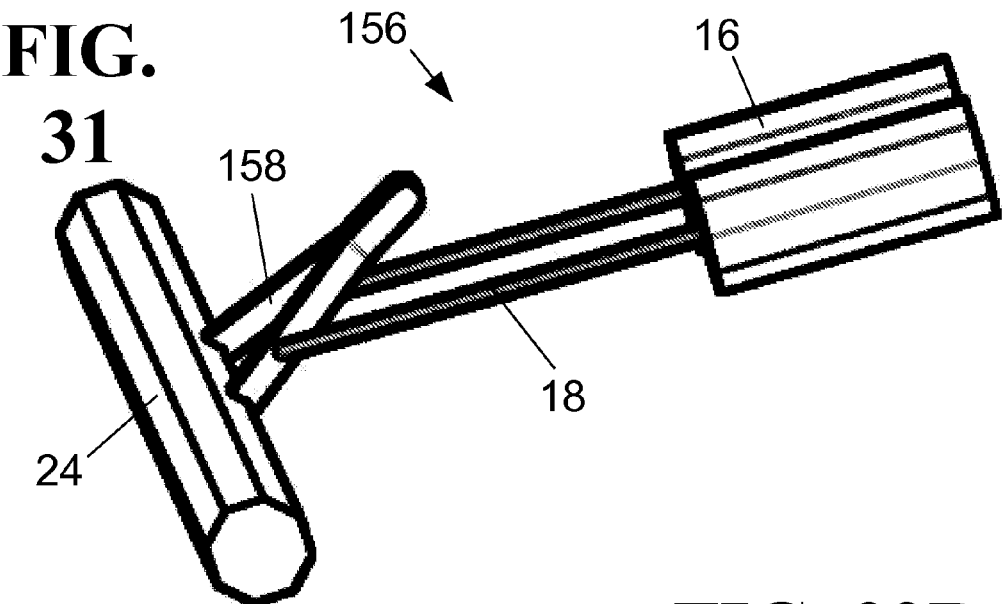
FIG. 31 is a perspective view of a backup device comprising two actuators, a movable bar, and a Y-shaped rotation arm.
Figure 32A:
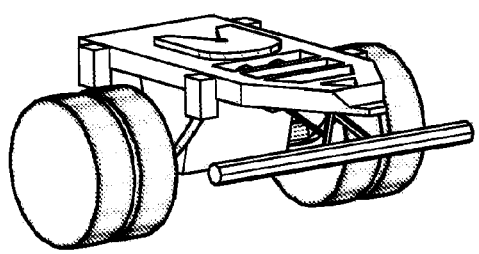
FIG. 32A is a front perspective view of a converter dolly with a backup device comprising two actuators, a movable bar, and a Y-shaped rotation arm.
Figure 32B:
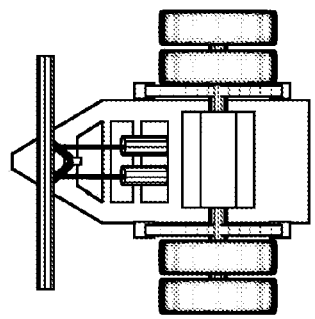
FIG. 32B is a bottom view of a converter dolly with a backup device comprising two actuators, a movable bar, and a Y-shaped rotation arm.
Figure 32C:
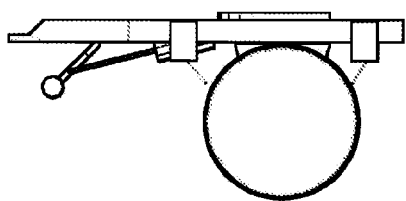
FIG. 32C is a side view of a converter dolly with a backup device comprising two actuators, a movable bar, and a Y-shaped rotation arm.
Figure 32D:
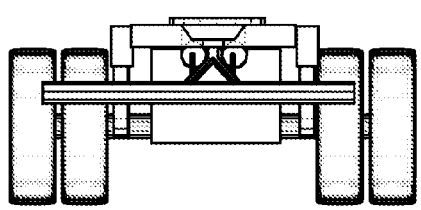
FIG. 32D is a front view of a converter dolly with a backup device comprising two actuators, a movable bar, and a Y-shaped rotation arm.

FIG. 31 is a perspective view of a Y-shaped backup device 156 comprising two actuators 16, a movable bar 24, and a Y-shaped rotation arm 158. The Y-shaped rotation arm 158 increases the backup device's ability withstand a torque on the bar without bending. Additionally, the Y-shaped connector provides additional locations for a shaft to connect. FIGS. 32A through 32D show a front perspective view, bottom view, side view, and front view of a converter dolly with a backup device with a Y-shaped rotation arm.

FIGS. 11D, 13F, 15D, 20D, 22D, 24D, 26D, 28D, 30E, and 32D illustrate laterally extending bars that extend from a portion directly in front of a road wheel (left or right side), through a vertical geometric plane such as shown in FIG. 7, to a second portion directly in front of a road wheel (right or left side) where the first and second portions are on opposite sides of the geometric plane.

Figure 33A:
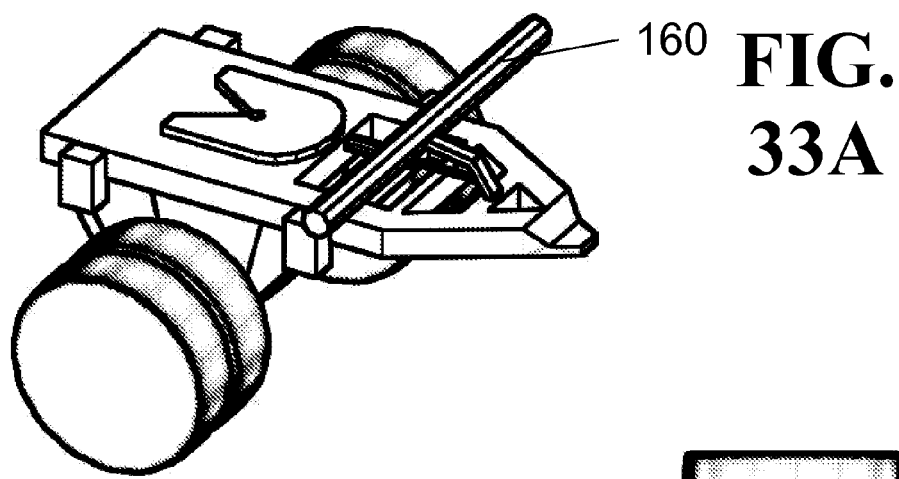
FIG. 33A is a top perspective view of a converter dolly with a top mounted backup device comprising an actuator, a rotation arm, and a jointed movable bar.
Figure 33B:
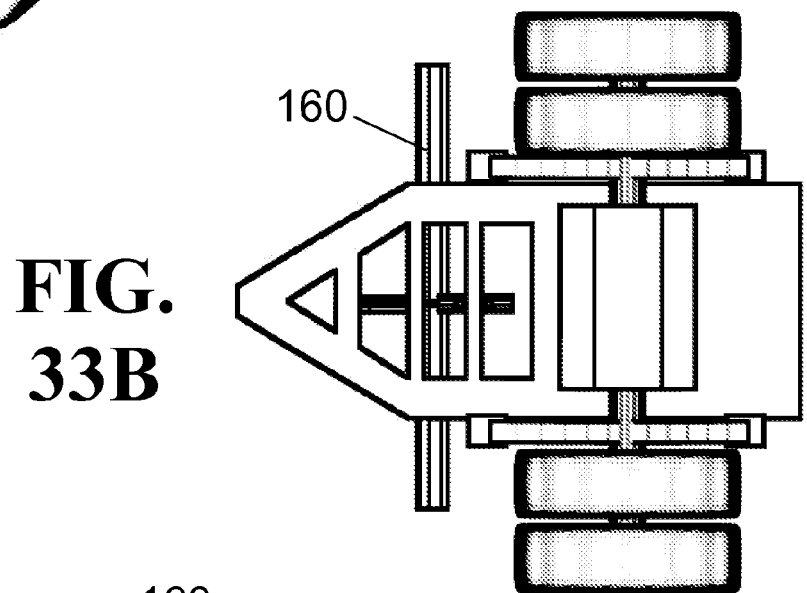
FIG. 33B is a bottom view of a converter dolly with a top mounted backup device comprising an actuator, a rotation arm, and a jointed movable bar.
Figure 33C:
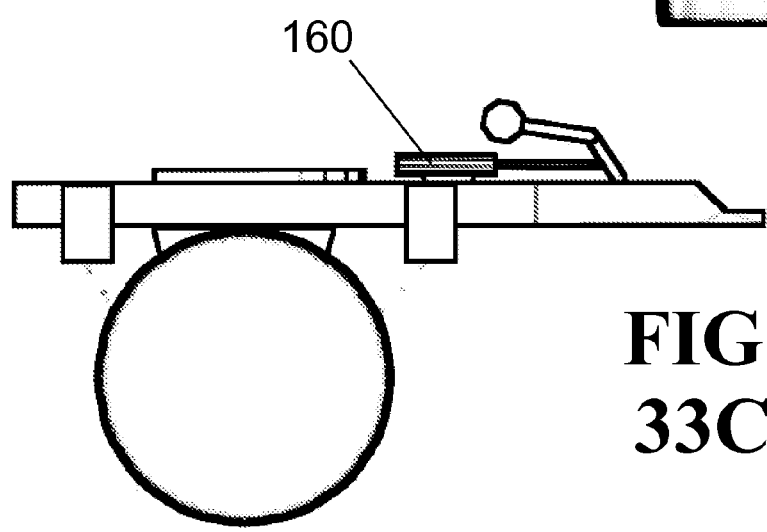
FIG. 33C is a side view of a converter dolly with a top mounted backup device comprising an actuator, a rotation arm, and a jointed movable bar.

FIG. 33A is a front perspective view of a top mounted backup device 160 mounted above of a converter dolly. FIGS. 33B and 33C show bottom and side views of the top mounted backup device 160. The top mounted device is positioned to be out of the spray region of the rear trailer tires and as such may require less maintenance.

Figure 34A:
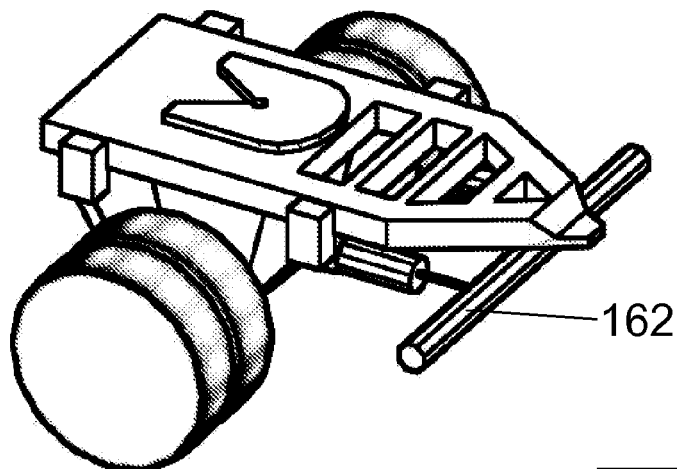
FIG. 34A is a top perspective view of a converter dolly with a bottom mounted backup device comprising two actuators directly connected to a movable bar.
Figure 34B:
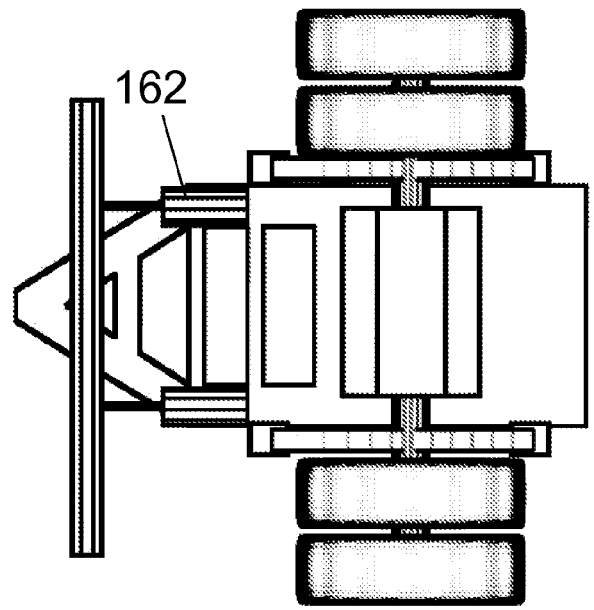
FIG. 34B is a bottom view of a converter dolly with a bottom mounted backup device comprising two actuators directly connected to a movable bar.
Figure 34C:
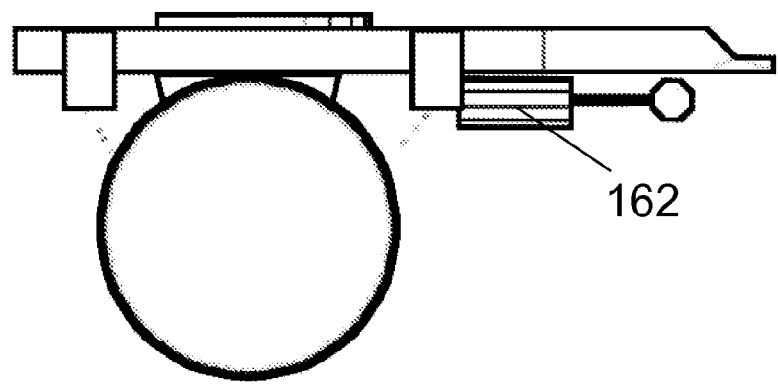
FIG. 34C is a side view of a converter dolly with a bottom mounted backup device comprising two actuators directly connected to a movable bar.
Figure 35A:
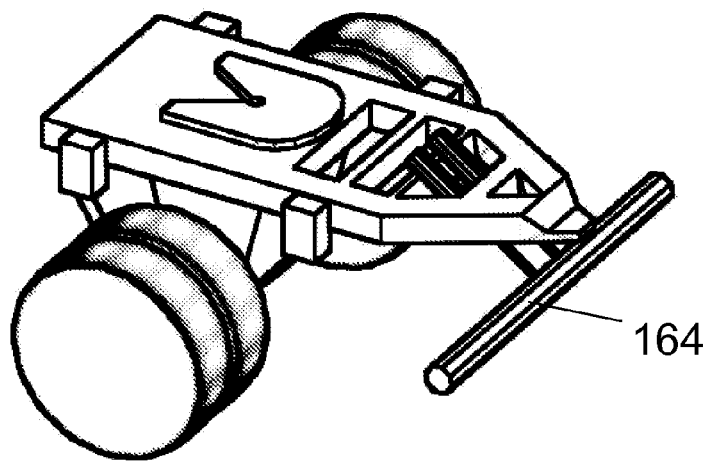
FIG. 35A is a top perspective view of a converter dolly with a top-mounted bottom-acting backup device comprising two actuators directly connected to a movable bar.
Figure 35B:
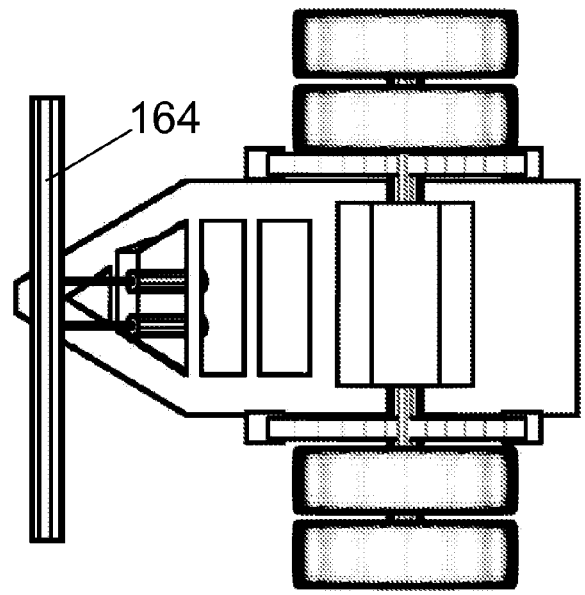
FIG. 35B is a bottom view of a converter dolly with a top-mounted bottom-acting backup device comprising two actuators directly connected a movable bar.
Figure 35C:
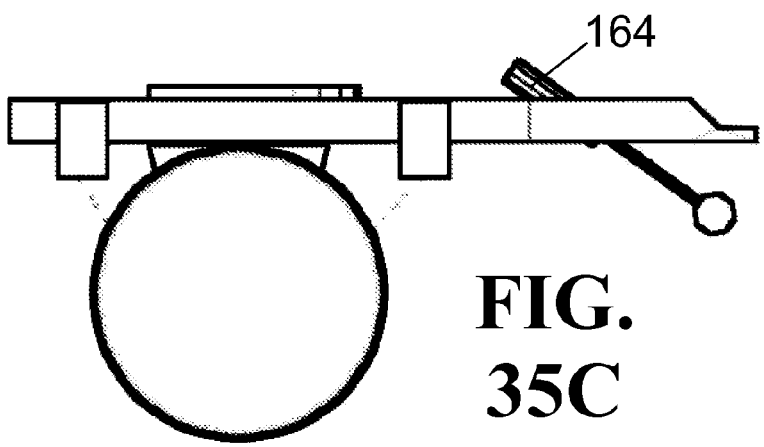
FIG. 35C is a side view of a converter dolly with a top-mounted bottom-acting backup device comprising two actuators directly connected a movable bar.
Figure 36A:
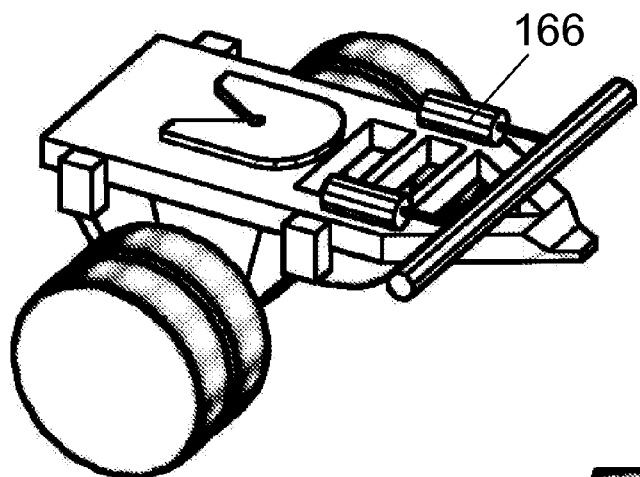
FIG. 36A is a top perspective view of a converter dolly with a top mounted backup device comprising two actuators directly connected a movable bar.
Figure 36B:
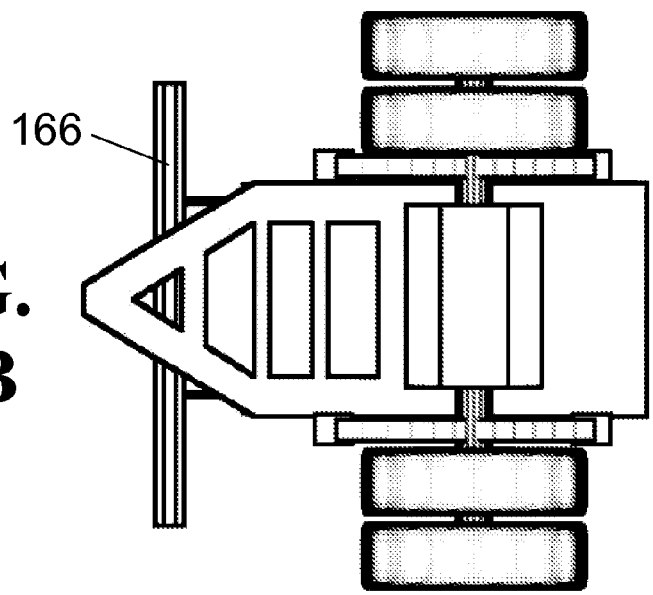
FIG. 36B is a bottom view of a converter dolly with a top mounted backup device comprising two actuators directly connected a movable bar.
Figure 36C:
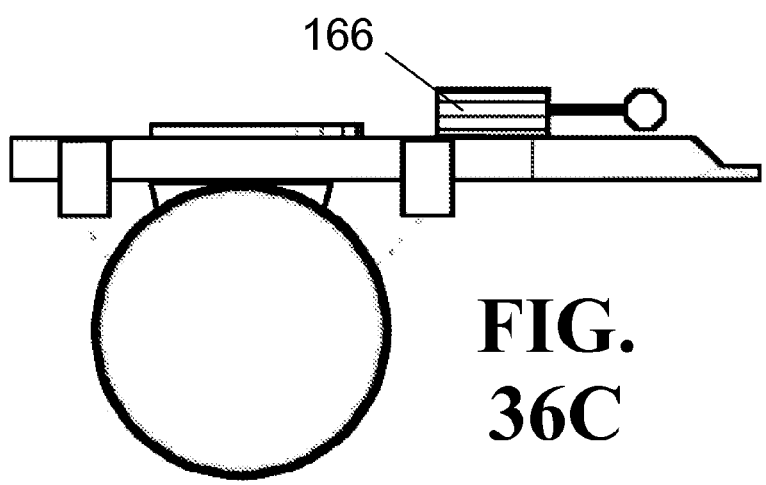
FIG. 36C is a side view of a converter dolly with a top mounted backup device comprising two actuators directly connected a movable bar.

FIGS. 34A, 34B, and 34C show views of a bottom-mounted non-rotating backup device 162. In the backup device illustrated, the bar is directly connected to the shafts of the actuators. The lack of a rotation arm simplifies the backup device and decreases the total weight of the device. As with the laterally acting backup device of FIGS. 29-30E, the bottom-mounted non-rotating backup device may be mounted at positions on a converter dolly lower than a possible for a rotating backup device. FIGS. 35A, 35B, and 35C show a top-mounted bottom-acting non-rotating backup device 164. The position on the actuator above the converter dolly protects it from the spray of the rear trailer wheels, while the bar moves below the converter dolly to interact with the rear trailer underride guard. FIGS. 36A, 36B, and 36C show top-mounted non-rotating backup devices 166. These devices are protected from the road spray caused by the rear trailer wheels and are able to interact with various portions of the trailer located above the rear trailer hitch.

Figure 37:
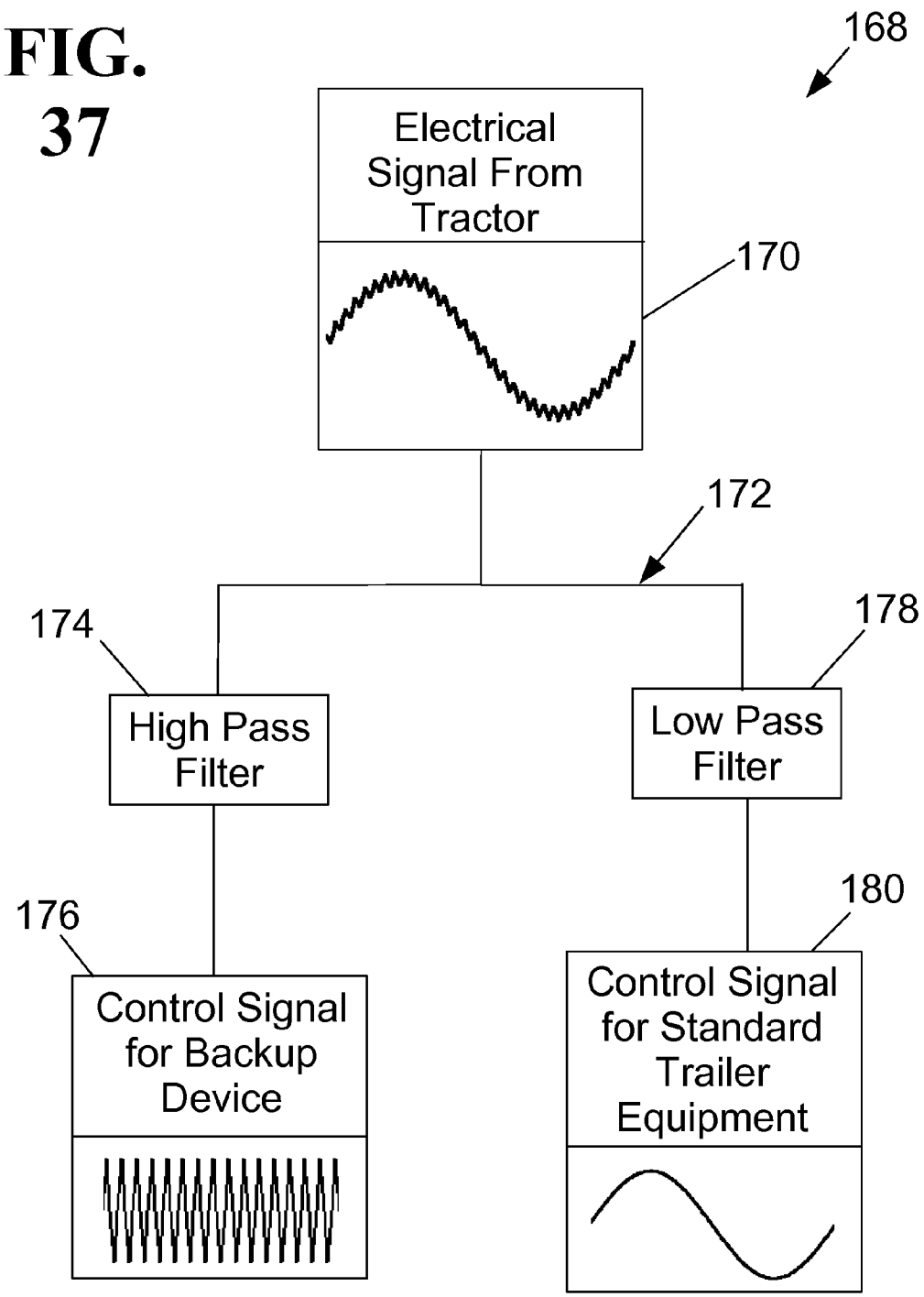
FIG. 37 is a schematic of a system using a single electrical waveform and transmission line to control a backup device and a conventional device on a trailer.

FIG. 37 is an electrical control schematic 168 of a system for utilizing a single transmission line to control multiple components on a trailer. A single electrical signal 170 with a high and low frequency component is sent on a transmission line 172 to multiple components on the trailer. In the illustrated example, a high pass filter 174 isolates the backup control signal 176, while a low pass filter 178 isolates a standard equipment control signal 180. The backup device control signal could be passed along with virtually any transmission lines between the tractor and trailers. Standard trailers have a seven wire cable (SAE J-1067) and associated seven pin connectors (SAE J-560) that connects the tractor to the trailer(s). The cable provides power to various aspects of the trailer such as turn signals and brake lights. Other methods of electrically controlling the backup device with electrical signals from the tractor will be obvious to those of reasonable skill in the art, and are within the scope of this invention.

Figure 38:
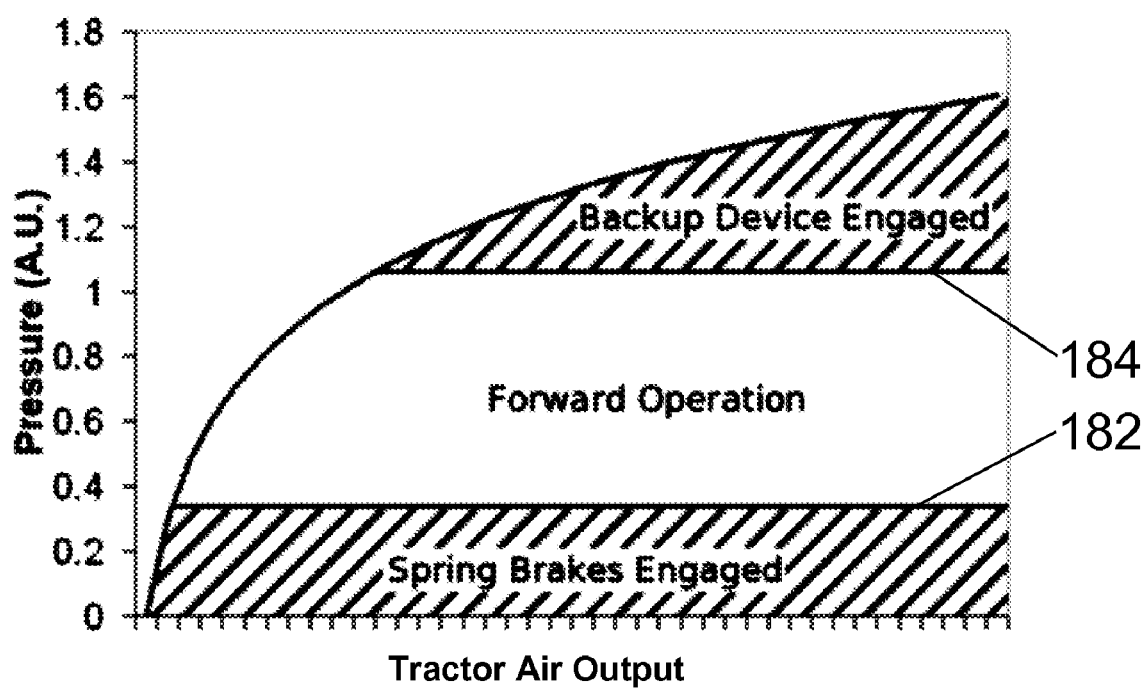
FIG. 38 is a diagram illustrating the pressure dependence of a system that uses pressure to control trailer spring brakes and a backup device.

Trailers often have spring brakes that engage if a set level of air pressure is not maintained. Tractors provide the air pressure to disengage the spring brakes. In one embodiment of the invention, the converter dolly backup device is also controlled by the air pressure generated by the tractor. In FIG. 38, as the air output from the tractor increases, a brake threshold 182 is reached where the air pressure is sufficient to disengage the spring brakes. As the tractor further increases the air pressure, a backup device threshold 184 is reached where the actuators of the backup device are operated. Because the spring brakes of a trailer would significantly hinder the reverse movement of a trailer using a backup device, the requirement of the spring brakes being disengaged to operate the backup device is not significantly detrimental to this embodiment of the invention.

Although electrical transmission lines and air pressure have been presented as two possible methods of controlling the converter dolly backup device from the tractor, other means for controlling the device will be obvious to those of reasonable skill in the art, and are within the scope of the invention. For example, a wireless local area network for the tractor-trailer rig may be used to control the converter dolly backup device.

The inventors contemplate several alterations and improvements to the disclosed invention. Other alterations, variations, and combinations are possible that fall within the scope of the present invention. Although various embodiments of the present invention have been described, those skilled in the art will recognize more modifications that may be made that would nonetheless fall within the scope of the present invention. Therefore, the present invention should not be limited to the apparatus described.

The invention claimed is:

1. A dolly capable of connecting a first trailer forward of a second trailer, a rear end of the first trailer having both a rear hitch and an underride guard with a plurality of vertical members, the dolly comprising:
   a longitudinally extending frame supported on laterally spaced road wheels,
   an actuator operatively connected to a laterally extending bar oriented substantially perpendicular relative to the frame, the actuator centrally mounted on the frame for linearly and longitudinally moving the laterally extending bar between
      a first position in which the laterally extending bar is located remote from all of the plurality of vertical members of the underride guard, and
      a second position in which the laterally extending bar is located proximal to the plurality of vertical members of the underride guard so as to be capable of contacting the vertical members to limit rotational movement of the dolly relative to the first trailer.

2. The dolly of claim 1 wherein
   each of the vertical members of the underride guard of the first trailer has a rearward oriented surface for contacting the laterally extending bar;
   the laterally extending bar has a forward oriented surface for contacting the plurality of vertical members; and
   the rearward oriented surfaces has a combined lateral width that is substantially less than the lateral width of the forward oriented surface.

3. The dolly of claim 2 wherein
   the plurality of vertical members of the underride guard of the first trailer extend down from a floor of the first trailer to a horizontal underride guard bar; and
   the laterally extending bar contacts each of the vertical members at a location above the horizontal underride guard bar and below the floor of the first trailer.

4. The dolly of claim 3 wherein
   the longitudinally extending frame includes
      a fifth wheel connector carried on the frame for supporting connection with a kingpin of the second trailer, and
      a forward hitch mounted centrally on a forward end of the frame for connection with the rear hitch of the first trailer; and
   the laterally extending bar extends
      from a first location forward of a first wheel of the road wheels,
      through a vertical geometric plane that includes portions of both the fifth wheel connector and the forward hitch of the dolly,
      to a second location forward of a second wheel of the road wheels, wherein the first and second road wheels are separated by the vertical geometric plane.

5. The dolly of claim 4 wherein the laterally extending bar includes
   a laterally extending inner core surrounded by a laterally extending compressible outer casing.

6. The dolly of claim 1 wherein
   the laterally extending bar has a plurality of laterally spaced saw tooth protrusions adapted for ratcheting against the plurality of vertical members of the underride guard of the first trailer.

7. The dolly of claim 1 wherein
the laterally extending bar has a pugil stick shape with
a first region having a first diameter, laterally extending between
a second region having a second diameter, and
a third region having a third diameter; and
the first diameter being substantially smaller than both the second and third diameters.

8. A trailer assembly comprising:
a forward trailer with a structure adapted for carrying cargo,
a dolly capable of connecting a rear trailer to the forward trailer, and
a backup device for limiting rotation of the dolly relative to the forward trailer,
the forward trailer including
a horizontal rear underride guard;
a rear hitch mounted centrally on a rear end of the structure; and
a pair of laterally spaced vertical posts on opposite sides of the rear hitch, each vertical post having both a length extending from the structure to the horizontal rear underride guard and a lateral width;
the dolly including
a longitudinal frame supported on laterally spaced road wheels,
a fifth wheel carried on the frame for supporting connection with the rear trailer,
a forward hitch mounted centrally on a forward end of the frame for connection to the rear hitch of the forward trailer; and
the backup device including
a laterally elongated rod having a leading surface adapted for contacting the pair of vertical posts, the leading surface having a lateral width substantially larger than the lateral widths of the vertical posts; and
an actuator connecting to both the frame and to the laterally elongated rod for longitudinally moving the laterally elongated rod relative to the frame.

9. The trailer assembly of claim 8 wherein
the laterally elongated rod extends
from a first location forward of a first wheel of the road wheels,
through a vertical geometric plane that includes portions of both the fifth wheel and the forward hitch,
to a second location forward of a second wheel of the road wheels, wherein the first and second road wheels are separated by the vertical geometric plane.

10. The trailer assembly of claim 9 wherein
the actuator connects to the laterally elongated rod via an arm extending out from the laterally elongated rod substantially perpendicular to a lateral axis of the laterally elongated rod.

11. The trailer assembly of claim 10 wherein
the laterally elongated extending rod has a first and second set of laterally spaced saw tooth protrusions,
each set of saw tooth protrusions is adapted for ratcheting against one of the vertical posts of the forward trailer,
the first set of saw tooth protrusions has an inverse angle of orientation relative to the second set of saw tooth protrusions such that the first and second sets of saw tooth protrusions are substantially symmetrical about the vertical geometric plane.

12. The trailer assembly of claim 11 wherein
the laterally elongated rod has a pugil stick shape with
a first region, with a first diameter, laterally extending between
a second region, having a second diameter and including the first set of saw tooth protrusions, and
a third region, having a third diameter and including the second set of saw tooth protrusions;
the first diameter being substantially smaller than both the second and third diameters.

13. A trailer convertor dolly assembly for connecting a front of a trailing trailer to a rear of a tractor-trailer having a rear underride guard with spaced-apart first and second vertical members, the converter dolly assembly comprising:
a plurality of laterally spaced wheels connecting to a longitudinally extending frame; and
a backup device including
a rotation arm connecting to the frame at a pivot point, the rotation arm rotatable about a horizontal and laterally oriented rotation axis;
a laterally extending bar oriented substantially perpendicular to the frame, the laterally extending bar adapted for contacting the first and second vertical members of the rear underride guard to limit rotation of the converter dolly assembly relative to the tractor-trailer, the laterally extending bar
attached to the rotation arm, rotatable about the rotation axis, and spaced from the rotation axis by the rotation arm.

14. The trailer converter dolly assembly of claim 13 wherein
the backup device further includes
an actuator connecting between the frame and the rotation arm for selectively rotating both the rotation arm and the laterally extending bar to both a first position and a second position wherein
in the first position, the laterally extending bar is substantially separated from both the first and second vertical members of the rear underride guard; and
in the second position, the laterally extending bar is located proximal to both the first and second vertical members of the rear underride guard to limit both clockwise and counter-clockwise rotation of the converter dolly assembly relative to the tractor-trailer.

15. The trailer converter dolly assembly of claim 14 wherein
the frame has a tongue region located forward of the plurality of laterally spaced wheels having a centrally located forward hitch, and a first and second support, each support extending from about the forward hitch toward the laterally spaced wheels; and
the rotation arm connects to and is substantially located below the tongue region of the frame;
wherein the tongue region located above the rotation arm prevents the rotation arm from rotating about both the horizontal and lateral rotation axis to a position substantially above the frame.

16. The trailer converter dolly assembly of claim 15 wherein
the actuator is remotely controlled from within a cabin in the tractor-trailer to rotate both the rotation arm and laterally extending bar to both the first and second positions.

17. The trailer converter dolly assembly of claim 16 wherein
the actuator is remotely controllable to rotate both the rotation arm and laterally extending bar to a third position between the first position and the second position, wherein in the third position, the laterally extending bar is proximal to the first vertical member and substantially separated from the second vertical member to limit rotation of the converter dolly assembly relative to the tractor-trailer in a single direction.

18. A method of straightening the trailer converter dolly assembly of claim 17 from a rotated position relative to the tractor-trailer to a substantially un-rotated position relative to the tractor-trailer, the method comprising the steps of:
   a.) selectively operating the actuator from the cabin to rotate both the rotation arm and the laterally extending bar from the first position to the third position such that when in the third position the laterally extending bar exerts a force on the first vertical member of the underride guard, and the first vertical member exerts a rotating torque on the trailer converter dolly assembly counter to the rotation of the trailer converter dolly assembly relative to the tractor-trailer;
   b.) selectively operating the actuator to transition from the third position to the second position such that the rotating torque applied upon the trailer converter dolly assembly rotates the assembly from the rotated position to the substantially un-rotated position relative to the tractor-trailer; and
   c.) selectively operating the actuator from the cabin to maintain both the rotation arm and the laterally extending bar in the second position such that when in the second position the laterally extending bar exerts forces on both the first and second vertical member of the underride guard, and the first and second vertical members of the tractor-trailer exert equal and opposite torques upon the trailer converter dolly assembly to maintain the substantially un-rotated position of the assembly relative to the tractor-trailer.

19. The trailer converter dolly assembly of claim 17 wherein
   the frame has a fifth wheel connector for supporting connection with a kingpin of the trailing trailer; and
   the laterally extending bar extends from
      a first location directly forward of a first wheel of the laterally spaced wheels,
      through a vertical geometric plane that includes portions of both the fifth wheel connector and the forward hitch,
      to a second location directly forward of a second wheel of the laterally spaced wheels, wherein the first and second laterally spaced wheels are separated by the vertical geometric plane.

* * * * *